(12) United States Patent
Monroe

(10) Patent No.: US 7,561,037 B1
(45) Date of Patent: Jul. 14, 2009

(54) APPARATUS FOR AND METHOD OF COLLECTING AND DISTRIBUTING EVENT DATA TO STRATEGIC SECURITY PERSONNEL AND RESPONSE VEHICLES

(76) Inventor: David A. Monroe, 740 Lincoln Center, 7800 IH 10 West, San Antonio, TX (US) 78230

( * ) Notice: Subject to any disclaimer, the term of this patent is extended or adjusted under 35 U.S.C. 154(b) by 196 days.

(21) Appl. No.: 11/617,521

(22) Filed: Dec. 28, 2006

Related U.S. Application Data

(63) Continuation of application No. 11/267,667, filed on Nov. 4, 2005, now Pat. No. 7,173,526, and a continuation of application No. 09/687,713, filed on Oct. 13, 2000, now abandoned.

(51) Int. Cl.
*G08B 19/00* (2006.01)

(52) U.S. Cl. ............... 340/521; 340/506; 340/539.1; 340/541; 340/533; 340/3.1; 340/937; 340/988; 346/148; 346/152

(58) Field of Classification Search ............... 340/521, 340/506, 539.1, 541, 533, 3.1, 937, 988; 348/148, 152, 153
See application file for complete search history.

(56) References Cited

U.S. PATENT DOCUMENTS

| | | | |
|---|---|---|---|
| 4,163,283 A | 7/1979 | Darby | |
| 4,179,695 A | 12/1979 | Levine et al. | |
| 4,197,536 A | 4/1980 | Levine | |
| 4,516,125 A | 5/1985 | Schwab et al. | |
| 4,831,438 A | 5/1989 | Bellman, Jr. et al. | |
| 4,845,629 A | 7/1989 | Murge | |
| 4,857,912 A | 8/1989 | Everett, Jr. et al. | |
| 4,891,650 A | 1/1990 | Sheffer | |
| 4,910,692 A | 3/1990 | Outram | |
| 5,027,104 A | 6/1991 | Reid | |
| 5,027,114 A | 6/1991 | Kawashime et al. | |
| 5,091,780 A | 2/1992 | Pomerleau | |

(Continued)

FOREIGN PATENT DOCUMENTS

EP 220752 5/1987

(Continued)

OTHER PUBLICATIONS

Apr. 1966, Apollo Unified S-Band System, NASA-Goddard Space Flight Center, Greenbelt, Maryland.

(Continued)

*Primary Examiner*—Daryl Pope

(57) ABSTRACT

A security and surveillance system for aircraft on the ground incorporates a plurality of strategically spaced sensors including video imaging generators, audio sensors, motion detectors, and fire and smoke detectors for monitoring critical components and critical areas of both the interior and the exterior of the a commercial transport such as an aircraft. The system is a comprehensive multi-media safety, tracking and/or surveillance system, which provides both visual and/or audio information as well as critical data such as location, direction, intrusion, fire and/or smoke detection and/or status of environmental conditions and/or asset systems status. The collected information is analyzed and prioritized according to type of event, location and nature of required response for automatically dispatching the proper response. The captured data and images are transmitted to a ground based security station for display on a monitor and may be recorded on a "black box" recorder as well as on a ground based recording system.

41 Claims, 21 Drawing Sheets

U.S. PATENT DOCUMENTS

| | | | |
|---|---|---|---|
| 5,111,291 | A | 5/1992 | Erickson |
| 5,166,746 | A | 11/1992 | Sato et al. |
| 5,218,367 | A | 6/1993 | Sheffer et al. |
| 5,243,340 | A | 9/1993 | Norman et al. |
| 5,243,530 | A | 9/1993 | Stanifer et al. |
| 5,268,698 | A | 12/1993 | Smith, Sr. et al. |
| 5,283,643 | A | 2/1994 | Fujimoto |
| 5,321,615 | A | 6/1994 | Frisbie et al. |
| 5,334,982 | A | 8/1994 | Owen |
| 5,341,194 | A | 8/1994 | Rose et al. |
| 5,400,031 | A | 3/1995 | Fitts |
| 5,408,330 | A | 4/1995 | Squicciarini et al. |
| 5,432,838 | A | 7/1995 | Purchase |
| 5,440,337 | A | 8/1995 | Henderson et al. |
| 5,440,343 | A | 8/1995 | Parulski |
| 5,448,243 | A | 9/1995 | Bethke et al. |
| 5,463,595 | A | 10/1995 | Rochall et al. |
| 5,469,371 | A | 11/1995 | Bess |
| 5,497,149 | A | 3/1996 | Fast |
| 5,508,736 | A | 4/1996 | Cooper |
| 5,530,440 | A | 6/1996 | Denzer et al. |
| 5,553,609 | A | 9/1996 | Chen et al. |
| 5,557,254 | A | 9/1996 | Johnson et al. |
| 5,557,278 | A | 9/1996 | Piccirillo et al. |
| 5,598,167 | A | 1/1997 | Zjderhand |
| 5,612,668 | A | 3/1997 | Scott |
| 5,627,753 | A | 5/1997 | Brankin et al. |
| 5,629,691 | A | 5/1997 | Jain |
| 5,636,122 | A | 6/1997 | Shah et al. |
| 5,642,285 | A | 6/1997 | Woo |
| 5,666,157 | A | 9/1997 | Avid |
| 5,670,961 | A | 9/1997 | Tomote et al. |
| 5,677,979 | A | 10/1997 | Squicciarini |
| 5,689,442 | A | 11/1997 | Swanson |
| 5,712,679 | A | 1/1998 | Coles |
| 5,712,899 | A | 1/1998 | Pace, II |
| 5,714,948 | A | 2/1998 | Farmakis et al. |
| 5,742,336 | A | 4/1998 | Lee |
| 5,751,346 | A | 5/1998 | Dozler |
| 5,777,551 | A | 7/1998 | Hess |
| 5,777,580 | A | 7/1998 | Janky et al. |
| 5,793,416 | A | 8/1998 | Rostoker et al. |
| 5,835,059 | A | 11/1998 | Nadel et al. |
| 5,850,180 | A | 12/1998 | Hess |
| 5,867,804 | A | 2/1999 | Pilley et al. |
| 5,917,405 | A | 6/1999 | Joso |
| 5,926,210 | A | 7/1999 | Hackett et al. |
| 5,933,098 | A | 8/1999 | Haxton |
| 5,938,706 | A | 8/1999 | Feldman |
| 5,974,158 | A | 10/1999 | Auty et al. |
| 5,983,161 | A | 11/1999 | Lemelson et al. |
| 5,999,116 | A | 12/1999 | Evers |
| 6,002,427 | A | 12/1999 | Kipust |
| 6,009,356 | A | 12/1999 | Monroe |
| 6,067,571 | A | 5/2000 | Igarashi et al. |
| 6,069,655 | A | 5/2000 | Seeley |
| 6,078,850 | A | 6/2000 | Kane et al. |
| 6,084,510 | A | 7/2000 | Lemelson et al. |
| 6,092,008 | A | 7/2000 | Bateman |
| 6,100,964 | A | 8/2000 | De Cremiers |
| 6,133,941 | A | 10/2000 | Ono |
| 6,154,658 | A | 11/2000 | Caci |
| 6,157,317 | A | 12/2000 | Walker |
| 6,181,373 | B1 | 1/2001 | Coles |
| 6,195,609 | B1 | 2/2001 | Pilley et al. |
| 6,226,031 | B1 | 5/2001 | Barraciough et al. |
| 6,246,320 | B1 | 6/2001 | Monroe |
| 6,259,475 | B1 | 7/2001 | Ramachandran et al. |
| 6,275,231 | B1 | 8/2001 | Obradovich |
| 6,278,965 | B1 | 8/2001 | Glass et al. |
| 6,282,488 | B1 | 8/2001 | Castor et al. |
| 6,292,098 | B1 | 9/2001 | Ebata |
| 6,356,625 | B1 | 3/2002 | Casteiani |
| 6,385,772 | B1 | 5/2002 | Courtney |
| 6,424,370 | B1 | 7/2002 | Courtney |
| 6,462,697 | B1 | 10/2002 | Klamer et al. |
| 6,476,858 | B1 | 11/2002 | Ramirez Diaz et al. |
| 6,504,479 | B1 | 1/2003 | Lemons |
| 6,522,532 | B2 | 2/2003 | Liao et al. |
| 6,525,761 | B2 | 2/2003 | Sato et al. |
| 6,549,130 | B1 | 4/2003 | Joso |
| 6,556,241 | B1 | 4/2003 | Yoshimura et al. |
| 6,570,610 | B1 | 5/2003 | Kipust |
| 6,628,835 | B1 | 9/2003 | Brill |
| 6,646,676 | B1 | 11/2003 | DaGrace |
| 6,662,649 | B1 | 12/2003 | Knight et al. |
| 6,675,386 | B1 | 1/2004 | Hendricks et al. |
| 6,698,021 | B1 | 2/2004 | Amini |
| 6,720,990 | B1 | 4/2004 | Walker et al. |
| 7,113,971 | B1 | 9/2006 | Ohi et al. |
| 7,173,526 | B1 * | 2/2007 | Monroe .................... 340/521 |
| 2003/0071899 | A1 | 4/2003 | Joso |
| 2005/0055727 | A1 | 3/2005 | Creamer et al. |
| 2005/0130803 | A1 | 6/2005 | Rastegar |

FOREIGN PATENT DOCUMENTS

| | | |
|---|---|---|
| EP | 232031 | 8/1987 |
| EP | 532110 | 3/1993 |
| EP | 209397 | 7/1993 |
| EP | 613109 | 8/1994 |
| EP | 613110 | 8/1994 |
| EP | 744630 | 11/1996 |
| EP | 785536 | 7/1997 |
| EP | 613111 | 8/1998 |
| JP | 6-301898 | 10/1994 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO9737336 | 10/1997 |
| WO | WO98/52174 | 11/1999 |

OTHER PUBLICATIONS

Nov. 24, 1976, TELEXIS ViaNet General Information Booklet Version 1.3.

2000, ViaNet 3000 Administrator's Manual Version 1.1- NetXpress Video by TELEXIS, Kanata, Ontario, Canada.

1999 Vianet 3000 Operator Manual Version 1.0—NetXpress Video by TELEXIS, Kanata, Ontario, Canada.

1999 ViaNet 3000 Administrator Manual Version 1.0—NetXpress Video by TELEXIS, Kanata, Ontario, Canada.

1999 ViaNet 3000 Instruction Manual Operator's Revision 1—NetXpress Video by TELEXIS, Kanata, Ontario, Canada.

* cited by examiner

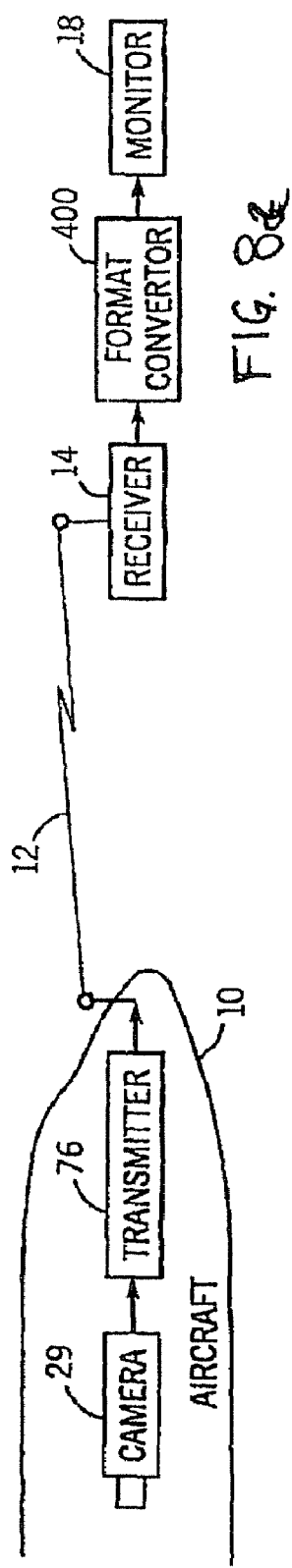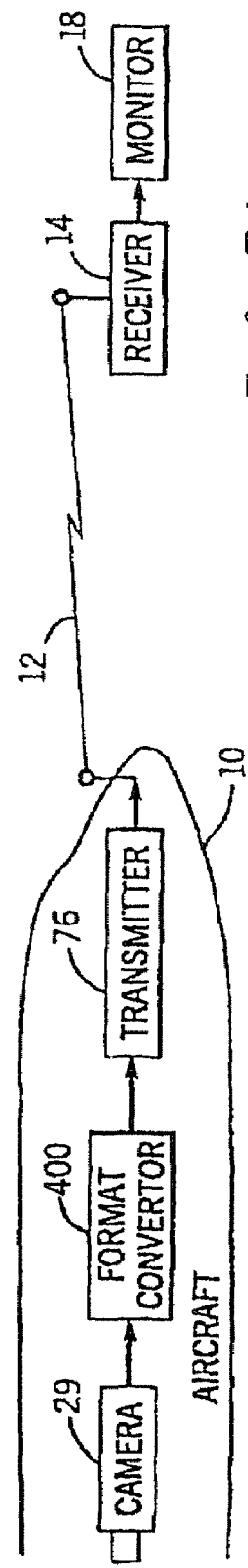

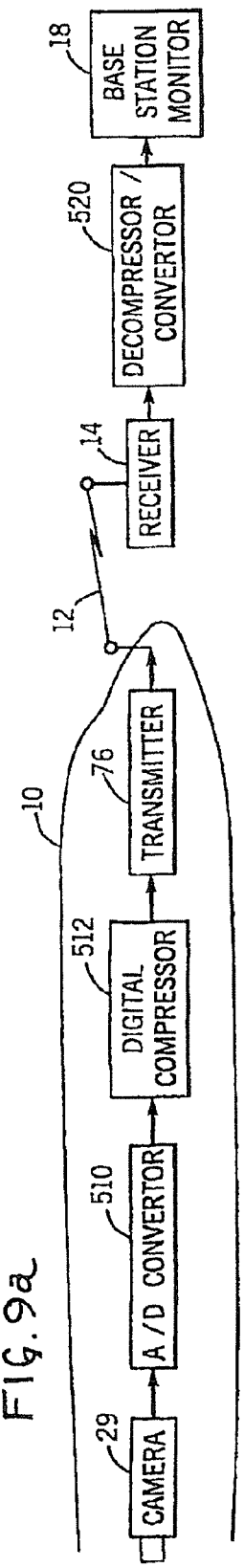
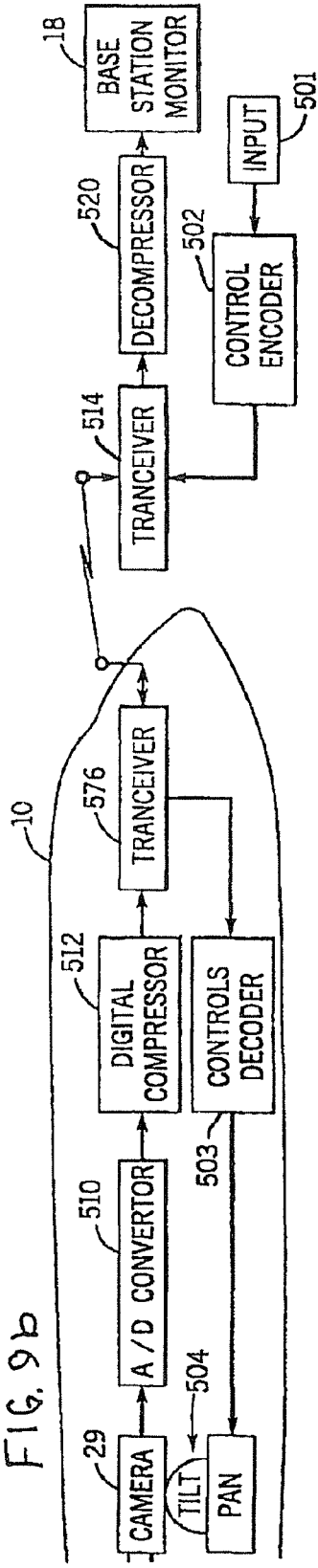
FIG. 9a
FIG. 9b

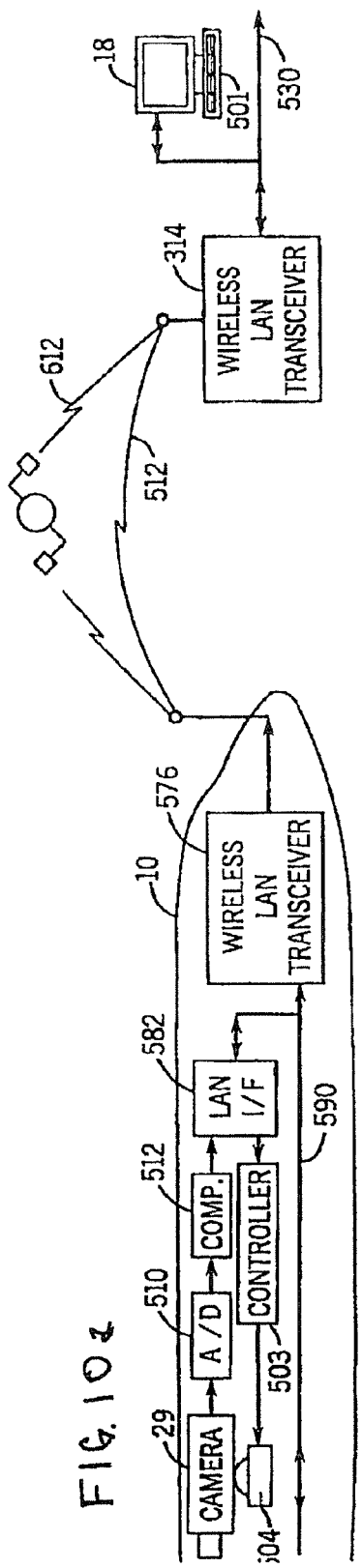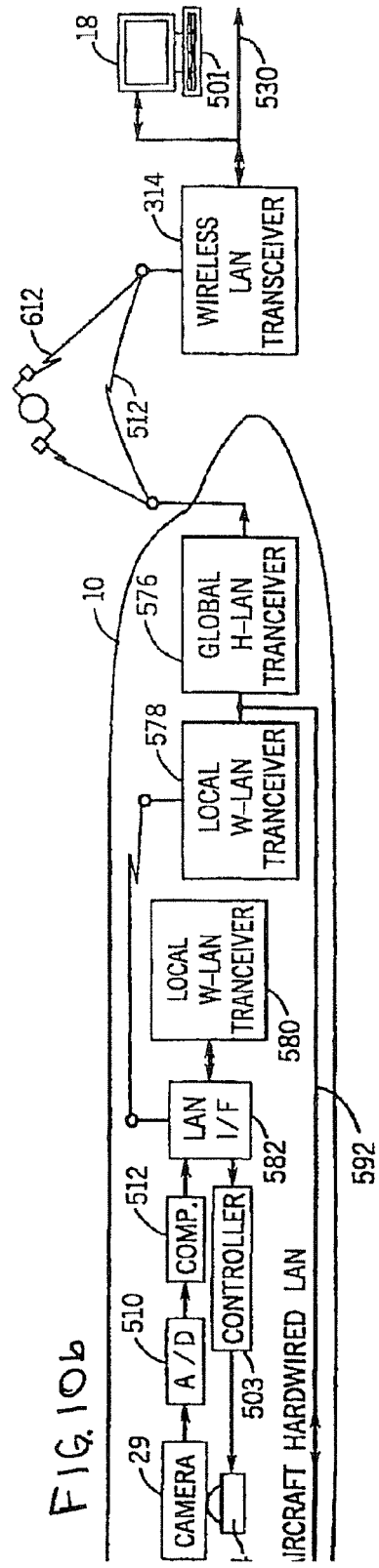

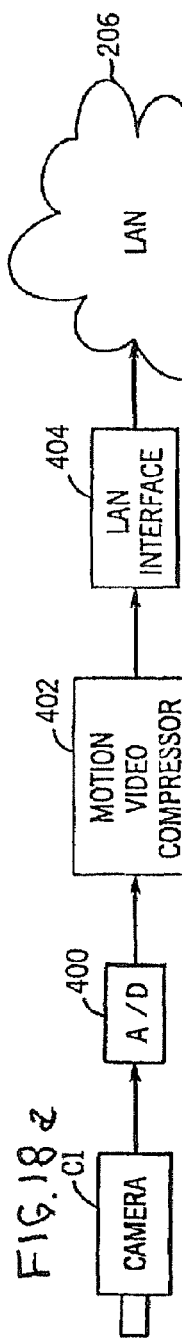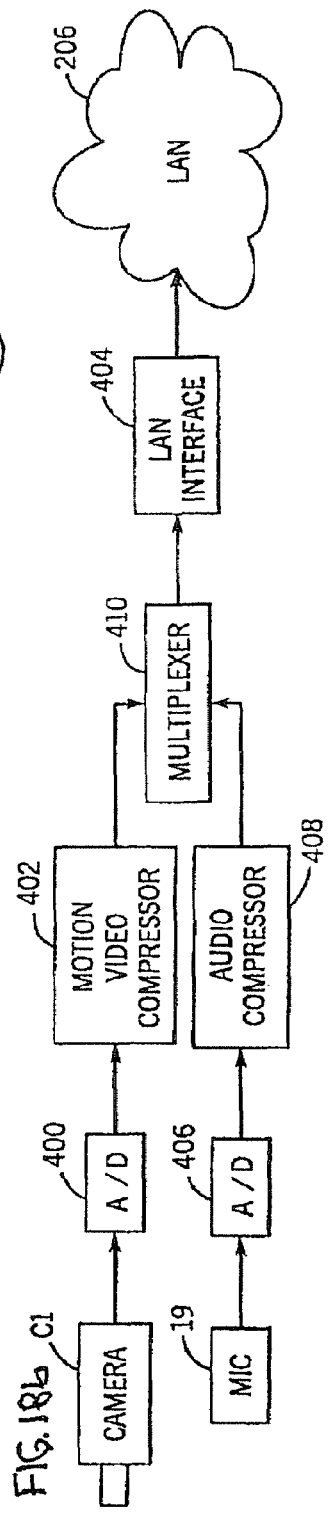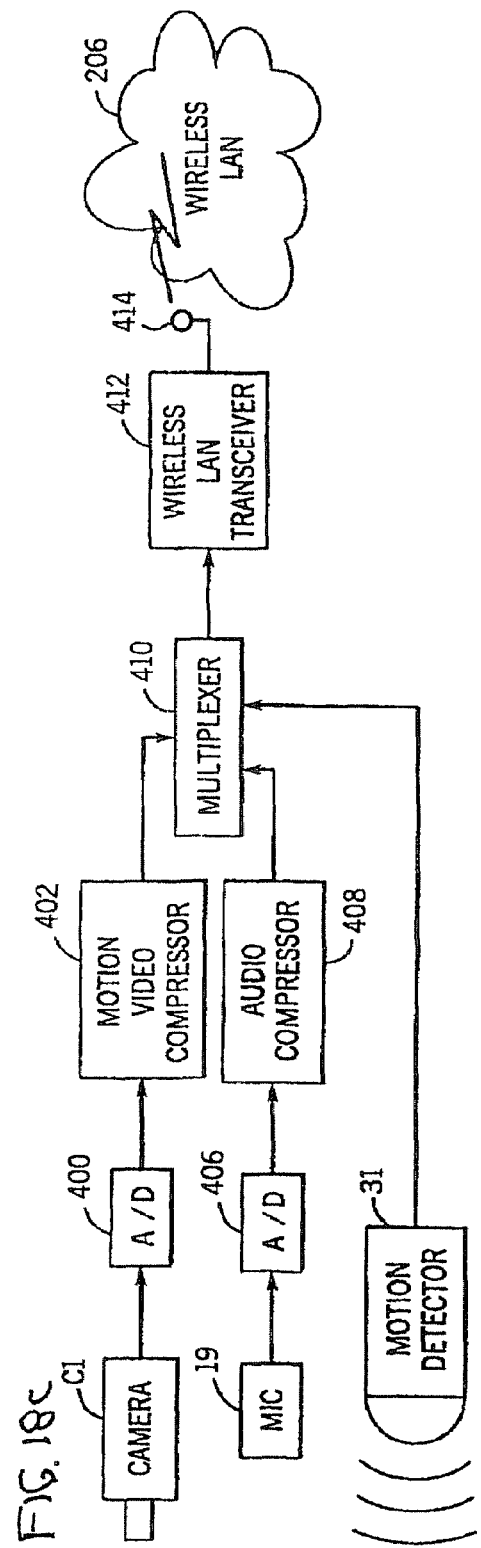

APPARATUS FOR AND METHOD OF COLLECTING AND DISTRIBUTING EVENT DATA TO STRATEGIC SECURITY PERSONNEL AND RESPONSE VEHICLES

CROSS REFERENCE TO RELATED APPLICATIONS

This application is a continuation of patent application Ser. No. 11/267,667 filed on Nov. 4, 2005 now U.S. Pat. No. 7,713,526 entitled "Apparatus for and Method of Collecting and Distributing Event Data to Strategic Security Personnel and Response Vehicles." This application is a continuation of Ser. No. 09/687,713, filed on Oct. 13, 2000 now abandoned entitled: Apparatus And Method Of Collecting And Distributing Event Data To Strategic Security Personnel And Response Vehicles and related to my copending applications entitled: Wireless Transducer Data Capture and Retrieval System for Aircraft, Ser. No. 08/745,536, filed on Nov. 12, 1996; Video and Data Capture Retrieval Surveillance System for Aircraft, U.S. Ser. No. 08/729,139, filed on Oct. 11, 1996; and Acoustic Catastrophic Event Detection and Data Capture and Retrieval System for Aircraft, U.S. Ser. No. 08/738,487, filed on Oct. 28, 1996 now U.S. Pat. No. 5,798,458, and my copending applications Ground Based Security Surveillance System for Aircraft and Other Commercial Vehicles; Ground Link with On-Board Security Surveillance System for Aircraft and Other Commercial Vehicles; and, Network Communication Techniques for Security Surveillance and Safety System, filed on even date herewith.

BACKGROUND OF INVENTION

1. Field of Invention

The subject invention is generally related to electronic safety and surveillance systems and is specifically directed to a comprehensive multi-media security surveillance system for collecting critical event data and for assessing the location and type of event for distributing the information to key response personnel based on location and capability. One desirable use of the invention is the use of this system for monitoring commercial transports such as aircraft or over-the-road vehicles while in port or terminal, whether taxiing or parked, while both attended and unattended.

2. Discussion of the Prior Art

Security is of ever increasing importance. Using the airlines as an example, global tracking systems are now in place to monitor the flight of the aircraft from the moment it lifts off until it safely lands at its destination. Radar an navigational positioning systems are commonplace both on the aircraft and at the ground tracking stations. All of these electronic systems have increased the overall safety record of commercial traffic to new standards as the number of miles flown continues to escalate.

In addition, the on board avionics including electronic monitoring and diagnostic equipment, particularly on large commercial jets, continues to evolve, giving both the on board crew and the ground assets more complete, accurate and up to date information regarding the condition of the aircraft while in flight, Flight recorders long have been incorporated in order to provide a record of each flight and in order to provide critical information to aid in the determination of the causes of an accident or malfunction should one occur.

However, one area which has been neglected with the ever increasing availability of electronic surveillance is the security of the aircraft or other vehicles or vessels, including, but not limited to, over-the-road vehicles, ships and other commercial transports (collectively referred to as commercial transports), particularly when unattended. Typically, when an aircraft is on the ground, or in port, and unattended the only security provided is the security of the location. If the security of the area in which the commercial transport is stored is breached, the commercial transport is an easy target. In most cases, even the access doors are left open and further, for obvious safety reasons, are designed not to be locked from the outside. Many critical areas of the commercial transport are left exposed such as in an aircraft, by way of example, the baggage hold, the landing gear, the engine housing and critical wing and tail components.

With terrorism and sabotage an increasing problem there is significant need to develop an integrated system capable of providing good physical/visual and/or audio surveillance as well as monitoring of the environmental, security and motion conditions of an area whether occupied by a commercial transport on the ground or in port. For example, a good visual surveillance system would give instant evidence of a breach of commercial transport security, could sound an alarm and could immediately secure the area.

Another use for the invention is the monitoring of public arena or event such as sporting events, public squares, arenas and the like. This is particularly true with respect to largely attended events such as the Olympics or in areas of high public use and activity such as commercial and public terminals. Such densely populated activities and concurrent concentration of high-value assets have made these activities the increasing targets of terrorist activities. This is in addition to the mechanical and structural failures, injuries to visitors and personnel and other accidents which occur during the normal course of operation.

The system of the subject invention would provide monitoring and reconstruction of events in such areas. The system would also permit the recording of visual information to provide a history for later review, providing yet another source of information for increasing the overall security.

While such a system would be of great benefit to the commercial transport and airline industries in general and to the commercial airlines in particular, there are no integrated systems currently available which adequately meets these needs.

SUMMARY OF THE INVENTION

The subject invention is directed to a comprehensive multi-media safety, tracking and/or surveillance system, which in the preferred form provides both visual and/or audio information as well as critical data such as location, direction, intrusion, fire and/or smoke detection and/or status of environmental conditions and/or asset systems status. It is an important aspect of the invention that the information, once collected, is analyzed and prioritized according to type of event, location and nature of required response for automatically dispatching the proper response.

In my aforementioned patent and copending applications, incorporated herein by reference, detection and sensor systems are utilized to provide the flight crew and/or a ground tracking station for commercial aircraft with critical information during flight and/or to record the information and data generated during flight for later reconstruction of catastrophic events. The subject invention is an improvement over and expansion of this concept and adds not only ground security and surveillance, but tracking while in port or on the ground as well as while in route, as well as incorporating the onboard systems of the aforementioned patent and applications. It is an important feature of the invention that the transmitting network provides a comprehensive communications link between stationary and mobile stations on the ground, as well as between these stations and the asset or area being monitored and both to and from strategic sensors onboard the commercial transport and on the ground. In the preferred embodiment of the invention, a wireless LAN (local area network), WAN (wide area network) or other wireless transmission scheme is used as the transmission system of choice. A digital wireless voice intercom is provided for security purposes and for communication between the onboard crew and the ground based personnel. In the preferred embodiment, a video intercom is also provided.

Digital wireless telecommunication capability provides for text communications. Digital wireless (such as, by way of example, LAN) based file communication capability permits the transmission of information such as route or flight plans or gate and dock information. As example, a LAN or WAN has worldwide tracking capability adapted to be used in connection with a global satellite communication system such as IRIDIUM, wherein the entire path and status of the commercial transport may be monitored while airborne over satellite connections. While wireless systems provide the preferred form of communication, many features of the invention may be practiced using other communication links within the scope and spirit of the invention.

One important feature of the invention is the ability to remotely monitor an area or an asset such as a commercial transport while on the ground, whether or not the commercial transport is attended. This will permit detection of unexpected events, breach of security, change in environmental conditions and other activities both on and in the vicinity of the commercial transport. A GPS or other location tracking system is included to provide accurate positioning information of the monitored zone or the specific commercial transport, establishing the geographic coordinates for the asset or event, and permitting the tracking its movements, as well.

The comprehensive surveillance/communication of the subject invention supports transmission of monitored data and/or commands or operational data between the ground or base station and the transport, between the transport and ground or terminal support vehicles and/or equipment, between the transport and various monitoring stations or systems, between transports, between the ground station and the support vehicles, between the monitoring station and support vehicles and between the monitoring stations or systems and the support vehicles. This permits the ground station to monitor and/or determine the identity, location, and heading of any vehicle in its range far tracking and collision avoidance, as well as monitoring sensor information, alarm conditions, emergency conditions, servicing requests, maintenance information, navigational information, requests for information such as flight plans, weather information, route maps, message traffic such as e-mail and the like. Similar information may be transmitted and received between transports, between transports and support vehicles and any of these and the ground station. The ground station may also send operational commands to the various monitoring systems both on-board the transport and ground mounted, such as camera tilt, pan and zoom and sensor activation. Other command signals such as "lock-on" a specific condition or transport, sensor download, activation such as "lights-on" or alarm (e.g., siren) activation and the like.

In a typical application, when an alarm from a specific transport is sent to the ground station it will be tagged with the GPS coordinates of the transport. The alarm will also be reported to a security system, typically including a computerized center that distributes the information of the wireless LAN and where used, the wired LAN. The mobile and/or personal security units will also report their GPS coordinates to the central computer so that the system knows the location of all security personnel at ant point in time. Once the alarm signal is received, the system can search and identify the closest appropriate personnel and alert them of the alarm condition. This is accomplished by calculating the length of the vectors between the transport GPS and the various personnel GPS signals. The shortest vectors are the nearest personnel and these can be alerted to respond to the alarm condition.

The selected personnel are then signaled by the security system of the present invention to respond. Audio, text and graphic communications may be utilized to inform the selected personnel of the condition and location. The system can also use its "mapping" function to assist the personnel in determining the best route to take in response. Because of the em comprehensive nature of the system of the subject invention, both audio and image conditions of the transport can be communicated directly to the selected personnel, using video conferencing compression techniques of the LAN. If the desired, the personnel can switch cameras to obtain different views, or gain control of the steerable camera disclosed herein and survey the scene as appropriate via remote control. The two-way communication capability of the system would also permit the personnel to communicate conditions and the need for additional personnel or equipment both to the system computer and directly to other personnel.

The security computer system will register the GPS location of the selected personnel as well as the location of additional or "back-up" personnel in order to coordinate their movements and actions. The system can then provide essential audio, video and communications to the selected back-up personnel in order to coordinate the entire operation. The coordinates of fixed sensors may also be entered into the system so that personnel can determine the proximity of each available sensor to his GPS location.

It should be noted that the request for back-up can be programmed to be automatically activated under certain conditions. For example, if a security personnel personal system detects an explosion or a gunshot, an automatic alarm condition can be activated to alert central security other personnel in the vicinity to indicated "potential bomb blast" or "potential automatic weapon", all based on the audio signal which is picked up by the sensors by comparing them to known acoustic signatures of these types of events.

In its preferred form, a plurality of sensor units, which may include at least one video or image sensor/device and/or at least one audio sensor and/or at least one motion sensor, are placed strategically about the area to be secured and, with respect to important assets such as a commercial transport, in and around the interior and exterior of the commercial transport, as well. In addition, strategically placed motion detectors, fire sensors, smoke sensors, door or latch sensors and other monitoring equipment are incorporated in the system. A comprehensive system incorporating these various sensing devices provide a broad based, multi-media safety, security and surveillance system for monitoring an area or an asset at any time, whether or not attended.

In addition to safety and/or surveillance issues, the comprehensive data collection scheme of the subject invention provides a system permitting enhanced monitoring and/or response to crew generated work orders or re-supply orders, and may even avoid the requirement that the crew order certain supplies. For example, by monitoring the fuel, fresh water, waste water and/or hydraulic levels onboard and transmitting this to a ground station, refueling, water delivery and/or hydraulic fluid check and supply may be initiated by the station crew and prepared for delivery when the commercial transport arrives in port. The performance parameters of the commercial transport may also be monitored and may be utilized for initiating maintenance procedures, for example, even before the commercial transport is in port. Pre-flight or pre-mission checklists may be enhanced or automated by monitoring the critical functions and criteria via the system of the subject invention. The, system of the subject invention greatly enhances maintenance procedures and efficiency. Where desired, the system is capable of permitting the commercial transport to carry its detailed maintenance record onboard, permitting full access to such information at remote locations. The maintenance record can be routinely updated or polled from the home based maintenance station using the system's unique uplink capability. The ability to both send and receive information will support remote control of the commercial transport onboard systems such as lighting, strobes, alarm setting/resetting, environmental controls, locking systems, siren or other audible signals, fuel flow, fire detection and the like.

The system of the subject invention permits complete monitoring of on ground movement, and allows the monitoring of other personnel and assets in the area to assure that the various activities and movements do not interfere with one another. This provides collision avoidance, and can be utilized both on the ground and in the air or in route via water or land. As an example, current airborne collision avoidance is accomplished by use of a radar transponder. Aircraft position is located by radar "echo" response and altitude by a "reporting altimeter" reading being returned to the radar system encoded in the transporter return. Use of a satellite based LAN or WAN will provide an "intranet in the sky", providing much more accurate GPS position, altitude, heading, speed and other navigational information to the FAA and other operators and computer tracking and monitoring stations, thus enhancing collision avoidance information.

Situational awareness is also provided by the subject invention. In the preferred, all authorized personnel, monitored areas and assets are provided with a GPS location sensor or other location footprint, such that the home or ground crew will be able to track and identify the location of every component within the system. One benefit of this system is the ability to monitor and manage the traffic flow of the assets and personnel, assuring that proper distance is maintained and appropriate pathways are followed, as well as assuring that appropriate assets and personnel are in authorized areas at the appropriate time. The system also permits full situational awareness capability where all ground or water transports in the are provided with GPS location information such that the ground crew will know where all assets are at any point in time. This can provide both collision avoidance as described and also check to assure that the transports are in an authorized area. A composite of all asset location information can be used to provide a "live" display of all assets in the area. Logging of this information will provide good archival information in the event a reconstruction of events, such as a security breach or collision, is required.

The comprehensive multi-media system of the subject invention permits the collection and dissemination of virtually all data associated with personnel, secured areas, assets and support vehicles at any time, both while in port or in service. In the preferred embodiment a combination of sensors systems are used, with sensors being installed within the asset, on its exterior and at ground-based locations for monitoring the transport when is in port. In such areas where ground based systems are not available, the on-board systems still provide useful and enhanced information over the prior art. Likewise, in those areas where unequipped assets enter a system equipped port, the ground based system of the subject invention can communicate via standard ground-to-asset radio to provide useful information such as perimeter surveillance and the like. For example, even without the use of on-board systems, the identification number (such as the tail number on an aircraft), owner, state or country of origin and other identifying information can be matched with available data to provide immediate and accurate identification of a specific commercial transport. This permits efficient tracking and response capability of the transport in port, on the ground, or anywhere in the world using satellite communications.

In the preferred embodiment, fixed view and steerable video cameras may be incorporated either on the commercial transport or independently of the transport at ground based sites where commercial transport is located in order to monitor movements around the perimeter of the monitored commercial transport. It is also desirable to include focusing and/or timing functions so that selective pan, tilt and/or zoom (x,y,z) positioning can be utilized. The cameras may be activated and/or aimed and/or focused based on the location data provided by a GPS system integral to the monitored commercial transport, may automatically pan an area, or may be manually operated by crew or ground personnel. Automatic tracking of each transport in the terminal by one or more tracking cameras in conjunction with a recording device can provide an archival record of each asset in case of a detrimental event, such as fire, terrorist event, theft, collision and the like.

Several video cameras may be placed such that the lens of each is aimed through a window opening provided in the fuselage or body in order to provide video imaging of the engines, tail section, and/or landing gear and other functional components of an aircraft. Cameras may be placed throughout the interior of the commercial transport on the flight deck, in the cargo hold, in passenger cabin and/or other desired spaces including on the ground outside the commercial transport. The audio sensors/transducers and/or other sensors and detectors are also strategically located throughout the commercial transport and positioned at strategic locations both internal and external of the fuselage. External sensors based on the ground area surrounding the commercial transport may also be added.

In its simplest form, current sensors are already on the commercial transport coupled with strategically based ground sensors and may be used to provide surveillance and/or warning system. Thus, a basic system may be implemented with a minimum of alteration to the commercial transport and a minimum of expense.

Within the commercial transport, the system may be hardwired or may use wireless transmission and receiving systems. The wireless system is particularly useful for adapting the system as a retrofit on existing equipment and also provides assurances against disruption of data transmission during structural catastrophes such as fire or airframe breakup. In the preferred embodiment, the wireless system is fully self-contained with each sensor unit having an independent power supply and where appropriate, a sensor light source. The ground sensors may likewise be hardwired or use wireless transmission and receiving of video and/or alarm telemetry signals. The ground security system may include motion sensitive, weight sensitive, infrared sensitive, audio sensitive, or other typed activation system so that the equipment is not activated until some event is detected, i.e., the system is action triggered. The ground communications link, monitoring and/or recording systems for collecting and/or transmitting the data as disclosed in my copending applications may be adapted for processing the information gathered by the on-ground security system and, in the preferred embodiment. The wireless system may use radio frequency transmission and may incorporate the wireless communication system already in place as an integral component of the system. Where desired, a wireless local area network {LAN) or other wireless system may also be utilized for intercommunication among the system components. Preferably, the entire capture, retrieval, monitor and archive system is installed utilizing the wireless transmitting/receiving system in order to assure that transmission will not be lost in the event of a power shutdown or a failure causing possible open or shorted circuit conditions which could occur in a hard wired system.

A commercial transport equipped with the ground surveillance system of the subject invention may not always be located at a port or terminal equipped with a ground security system. In the preferred embodiment of the invention, the on-board system is self-contained and can operate on a stand-alone basis at sites where compatible comprehensive electronic ground security is not available. In those sites with a compatible ground surveillance system, the on-board system communicates with the site-based system to provide information to airport ground personnel and security personnel. The system of the present invention also lends well to a deployable surveillance device carried by the transport, which can be deployed at unequipped sites to permit off-craft monitoring while the commercial transport is at the port or terminal. The system can be positioned at a strategic location within the site whenever the commercial transport is unattended to permit monitoring of the commercial transport from a remote location. The deployable device is then retrieved and stowed in the commercial transport when the commercial transport departs from the site.

In the preferred embodiment, the system will transmit any detected information to a monitor system located at a ground control security station, typically located somewhere within the terminal, tower and/or safety sites such as security stations and fire stations. Detection of activity or fire can sound local and/or remote alarms and/or dial emergency numbers. The data may also be recorded on the standard recorders provided onboard the commercial transport and/or on ground based recorders of conventional type, digital type or a computer based logging system. The security station has instant live access to all of the image and/or audio signals as they are captured by the sensors, and where used, the commercial transport recorder will make an historic record of the images for archive purposes. Where random access recording techniques are used, such as, by way of example, digital random access memory storage devices, the information by be readily searched for stored information.

If unauthorized personnel breaches the security area and the audio and/or video equipment is activated, signals will be immediately transmitted to the security station. This will give immediate access to information identifying the activity and the personnel involved. Further, in the preferred embodiment of the invention, an alarm system will be activated for securing the immediate area and taking counter measures to tighten security such as remote operation of lights and doors, and respond to a breach of same.

In the one embodiment, information from the plurality of sensors on the transport is synchronized through an on board capture/multiplexing system whereby the plurality of data, including visual image data, may be displayed, recorded, and/or transmitted in either a split screen or serial fashion. A "time-stamp" or chronology signal may also be incorporated in the data scheme. Any signal which is capable of being captured and stored may be monitored in this manner. Utilizing the wireless system of the invention in combination with the battery back-up power supply, it is possible to continue collecting information without using ground power or commercial transport power. This assures that the system will operate even if power is disrupted for any reason such as, by way of example, tampering by unauthorized personnel or by fire. In its simplest form, only triggered (activated) sensors are active, i.e., an activity at the site causes a triggering effect and activates the sensor, and only the signals generated thereby are transmitted to the security station. In such a system, multiplexing of continuous signals is not nearly as critical. The "time-stamp" is particularly useful as an aid in reconstructing the events in a "post-event" investigation.

In the one embodiment, the system includes a plurality of strategically located video image sensors and/or audio sensors, each sensor adapted for transmitting the signals to a multiplexer for distributing the signals to monitors and/or archival recorders. The data multiplexer combines all of the signals from the various detector circuits to provide a data stream suitable for transmission over the wireless system.

The LAN transceiver is the interface into the LAN. The LAN transceiver can accept software downloads from various system elements to enable the multi-media sensor system to be maintained or upgraded to perform other functions. Other sensors may also be incorporated in the system, such as motion sensors, smoke and/or fire sensors and the like. The system is configured for selectively transmitting all of the data on a "real-time" or "near real-time" basis, i.e., the data is delivered with only delays for processing time such as compression/decompression, multiplexing and the like. The system is also adapted to provide the monitors access to serial, synchronized full screen view of each of the cameras, in sequential viewing, or alternatively to provide split screen or multi-monitor viewing of a plurality of cameras. The system may be hardwired or wireless transmission may be utilized to further minimize the possibility of a malfunction at the onset of a catastrophic occurrence and to make the system more tamper resistant.

Shock and vibration detectors may also be included both on board, at fixed locations on the ground and in the portable or mobile units. For example, if a personal unit is dropped, an alarm would be generated. Smoke and heat detectors may also be incorporated to monitor the safety of the environment of personnel.

It is a primary object and feature of the subject invention to provide for the monitoring and surveillance of an area and/or asset and collect event data relative to the area and/or asset for prioritizing the data and dispatching an automated appropriate response. It is another object of the subject invention to provide the method and apparatus for a comprehensive, multi-media, wireless surveillance and monitoring system for monitoring and tracking a commercial transport vehicle while in port or while in route.

It is a further object and feature of this invention to provide a comprehensive surveillance and monitoring system supported by a wireless transmission system whereby communication of all data including live video and/or audio transmissions can transmitted between the transport, ground or base stations, remote sensor systems, remote or mobile monitoring systems and other transports.

It is also an object and feature of this invention to monitor the location and types of personnel and support assets available and to distribute collected event information to the appropriate parties.

It is a further object and feature of this invention to establish and alert appropriate assets and personnel for response to an event detected as occurring at a monitored area and/or asset.

It is another object and feature of this invention to provide tracking capability to assure that a transport stays in an assigned zone while either in route or in the port or terminal. It is a further object and feature of this invention to provide communication capability for monitoring and/or responding to supply needs on board the transport in order to permit support personnel to expedite response and/or re-supply when the transport arrives in port.

It is also an object and feature of this invention to provide for monitoring of situational conditions of and surrounding the transport both while in port and while in route.

It is yet another object and feature of this invention to provide means for archiving performance parameters for later recall in order to review performance and/or reconstruct events.

It is an additional object and feature of this invention to provide a ground surveillance and security system for detecting the breach of commercial transport security while the commercial transport is on the ground or in a port or terminal and is unattended.

It is another object and feature of the subject invention to identify that a commercial transport is on the ground and needs to be monitored for tracking its exact location, and its orientation on the ramp.

It is also an object and feature of the subject invention to provide a security system, which is integral with the commercial transport for providing ground security.

It is a further object and feature of the subject invention to provide communications between the commercial transport and a ground security station to assure commercial transport security while the commercial transport is parked or unattended.

It is another object and feature of the subject invention to provide a comprehensive, multimedia data generating, collecting, displaying, transmitting, receiving and/or storage safety and/or surveillance scheme for commercial transport.

It is also an object and feature of the subject invention to provide an on ground security system which incorporates the in-flight surveillance system in order to minimize the number of additional components required to implement the system.

It is also an object and feature of the subject invention to store video, images, audio and/or transducer data on the commercial transport being protected and/or at the ground security station.

It is yet another object and feature of the subject invention to provide apparatus for permitting ground and/or base personnel to receive video, images, audio information and/or data relating to critical components and areas of a commercial transport and operational data such as dispatch information.

It is still another object and feature of the invention to permit the monitoring, storing and retrieval of any of a variety of video, images, audio signals and/or performance data by the tracking, surveillance and/or imaging equipment on board the commercial transport.

Other objects and features of the subject invention will be readily apparent from the accompanying drawings and detailed description of the preferred embodiments.

BRIEF DESCRIPTION OF THE DRAWINGS

FIGS. 8a and 8b are diagrams of a simplified, basic camera/transmitter to base station system utilizing an a conventional wireless transmission system between transport and the base station, and adapted for converting generally incompatible systems in order to make the system of the subject invention of universal application.

FIGS. 9a and 9b are diagrams of a simplified, basic camera to base station utilizing a digital wireless transmission system such as, by way of example, a digital radio, wireless digital LAN or other wireless communication system.

FIGS. 10a and 10b are diagrams of an expanded system similar to FIG. 9b, but showing use of an on-board hardwired system and on-board wireless system, respectively.

FIGS. 18a, 18b and 18c are illustrations of various system configurations for a wireless local area network (LAN) system.

DETAILED DESCRIPTION OF THE PREFERRED EMBODIMENTS

Figure 1:
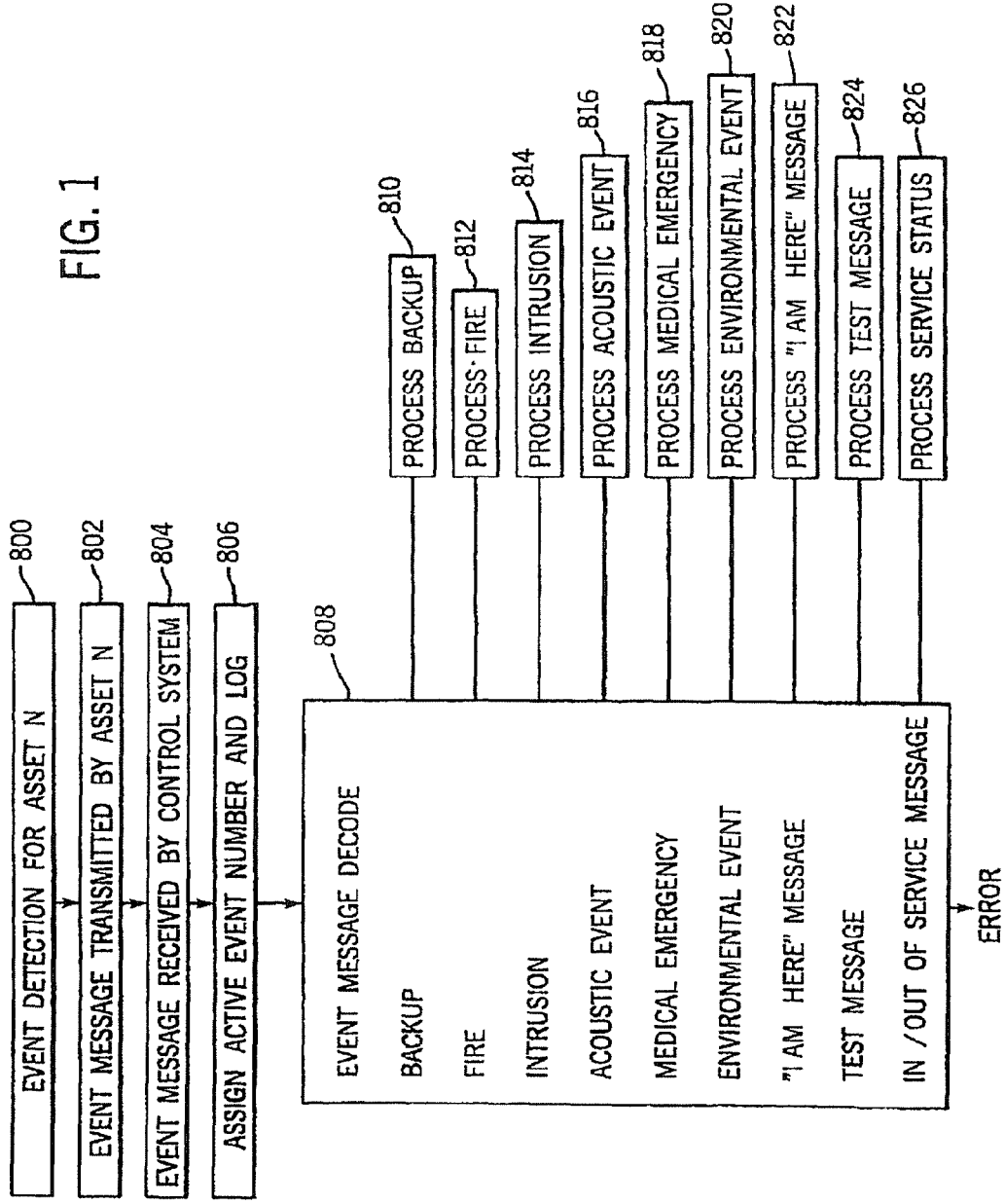
FIG. 1 is a flow diagram of an event triggered automatic response system in accordance with the subject invention.

It will be readily understood that the various components and features of the subject invention can be utilized in connection with a tracking, security and/or surveillance system for any of a variety of applications. For purposes of brevity, the features of the invention are described in detail herein as applied to commercial aircraft. This is primarily because it is assumed that aircraft systems are likely to incorporate the most complex and comprehensive surveillance systems of the subject invention due to the importance of securing this commercial transport while on the ground and both the importance and complexity of monitoring and tracking same while in port or in route. The system may be scaled up or scaled down depending upon application. For example, land vehicles such as railroad rolling stock or over the road trucks may need only door sensors, motion sensors and brake monitors, whereas aircraft, as described, will require a substantially more comprehensive system in order to provide adequate surveillance. Where the system is employed to secure an area such as a public square, an arena or the like, it is recognized that on-board systems are not employed and that the geographic location is fixed. In the embodiment for aircraft as described in detail herein, the comprehensive surveillance system utilizes the on-board aircraft system in combination with a ground-based wireless system. The wireless configuration can also be applied to the sensors on board the aircraft using the same architecture as described here for the ground based portion of the system. That is, the on board elements may be hardwired, may communicate through wireless radio, or may utilize wireless LAN as herein described, or a combination. The LAN radio provides a wireless LAN connection to other system elements. This is a well-know but evolving technology that allows high bandwidth wireless data transmission between multiple devices. Several different techniques are available from a variety of manufacturers, including Raytheon Systems Corporation, the assignee of the subject invention. Many of these techniques may be utilized in the subject invention.

The comprehensive system includes various condition sensors, motion and audio detectors, video cameras, light detectors, sound detectors, contact switches, temperature detectors and control systems for controlling light, and sound transmissions to the aircraft. A temperature and/or humidity detector may be used for general monitoring functions such as predicting the icing of the wings in winter conditions, or for fire alarm functions. The temperature detector may be any known form for temperature transducer, such as a PTC, NTC, thermistor, or semiconductor element. More advanced semiconductor elements may be used, such as integrated circuit types that may include integral temperature and/or humidity sensors, references, analog/digital convertors, protocol engines and serial driver. Further, integrated circuits can incorporate on-board digital radio elements such as DSP based radios to be completely integrated self-contained chips. The temperature analog/digital convertor adapts the ambient temperature of the environment into a digital data stream. This digitizer runs at suitable rates for continuous temperature monitoring. A signal processor can be used to provide correction to the temperature and/or humidity elements, such as processing out non-linear characteristics of the sensors. It can also be used to look for profiles such as rapidly rising temperature/humidity conditions that may indicate a fire or open door or other security breach. Detection of such an event would trigger a specified unique alarm condition to be transmitted back to other elements of the system.

One of the most significant factors in determining the overall complexity of the system is the cost associated with the various sensor components. For example, in certain applications it may be desirable to add a humidity detector or a carbon monoxide detector. A digital camera may be used, or an analog camera may be used in combination with an analog to digital convertor, or digital with internal digitization circuits, or digital compressed with an internal analog to digital convertor and a motion video compressor. In the preferred embodiment, the camera runs at full-motion rates. However, it will be readily understood that the camera can run at lesser rates for still frame or step video applications. In all cases, accurate information can be supplied on a "real-time" basis, i.e., the information can be transmitted, received and acted upon by man or machine in a timely fashion, sometimes with slight delays, to permit adequate response to an event. The video analog/digital convertor is functional to adapt the analog light modulated signal representing the video scene into a digital data stream. This digitizer can run at "real-time" rates for processing full motion video, or could operate at lesser rates for still frame or step video applications. The signal processor/motion video compressor is flexible and will provide various functions depending upon application. For example, the video processor/compressor subsystem can be programmed to perform functions such as motion detection in several well-known manners and methods. Several techniques are utilized to accomplish motion detection, but the most general method involves capturing repeated video frames and comparing differences in those repeated frames over time. Other techniques such as edge analysis, which looks for specific characteristics in the image, and the changes in such characteristics, may also be used. The processor/compressor subsystem can also be used to image process the video for purposes of contrast enhancement, dynamic range improvement, noise reduction and/or other well-known video processing methods, or other circuitry so configured to perform the processing by well-known techniques. When the video processor/compressor is used for motion detection, any detection will generate a specified unique "alarm condition" to be transmitted to other elements of the system.

FIG. 1 is a flow chart of the information collection and distribution provided by the system of the subject invention. The subject invention provides the method and apparatus for monitoring a location such as an asset, per se, for example a commercial transport such as aircraft 10 (see FIG. 6) or a strategic area such as a taxiway (see FIG. 21) for the occurrence of an event and collecting information relating to the event. The information is then prioritized and dispatched to various receiving units for initiating an appropriate response based on the prioritization criteria. As specifically shown in FIG. 6, strategic sensors such as cameras 210*a* and 210*b* are positioned in predetermined ground based locations, with a geographic location identifier. Additional sensors such as sensor 200 may be placed on board the aircraft 10. This may be an integral on board sensor system such as that disclosed in my aforementioned copending applications and prior patents. This sensor may also include a geographic location transmitter such as a GPS signal generator. With specific reference to FIG. 1, the system of the subject invention is responsive to an event monitored and detected by the various sensors, as indicated at 800 to transmit the event message at 802 to the central system or system wide, as indicated at 804. In the preferred embodiment the event is assigned an event identifier or number and logged for archival purposes, as indicated at 806. The message is then decoded at 808, to identify the location and time of the event, as well as the type of event based on the sensor signal. The event signal is then distributed over the network based on the required appropriate response, the location of personnel and the location of response equipment. For example, turning again to FIG. 6, is the event is indicated to be a fire, the closest personnel 218*b* may be alerted as well as the closest fire response vehicle 352*c*. The type of event and the pre-programmed response will generate the appropriate distribution signal from the decoding and control system indicated at 808. For example, personnel 218*b* (FIG. 6) may send out a signal for additional or backup personnel. This will alert appropriate personnel, as indicated at 810. Different priorities will be established and different methods of distribution will be generated for different types of events such as, by way of example, a fire 812, unauthorized entry or intrusion of the area or the asset 814, an acoustic event such as an explosion or gunfire 816, a medical emergency 818, an environmental event 820 and the like. Response messages such as arrival at event location 822, or specific textual input by personnel 824 or other service and system information may also be distributed to and responses generated by the system through the central system decoding computer as indicated at 808. This system permits prioritization of the data based on the source of the data, the location of the event and the type of personnel responding to the data as well as specific response information.

Figure 2:
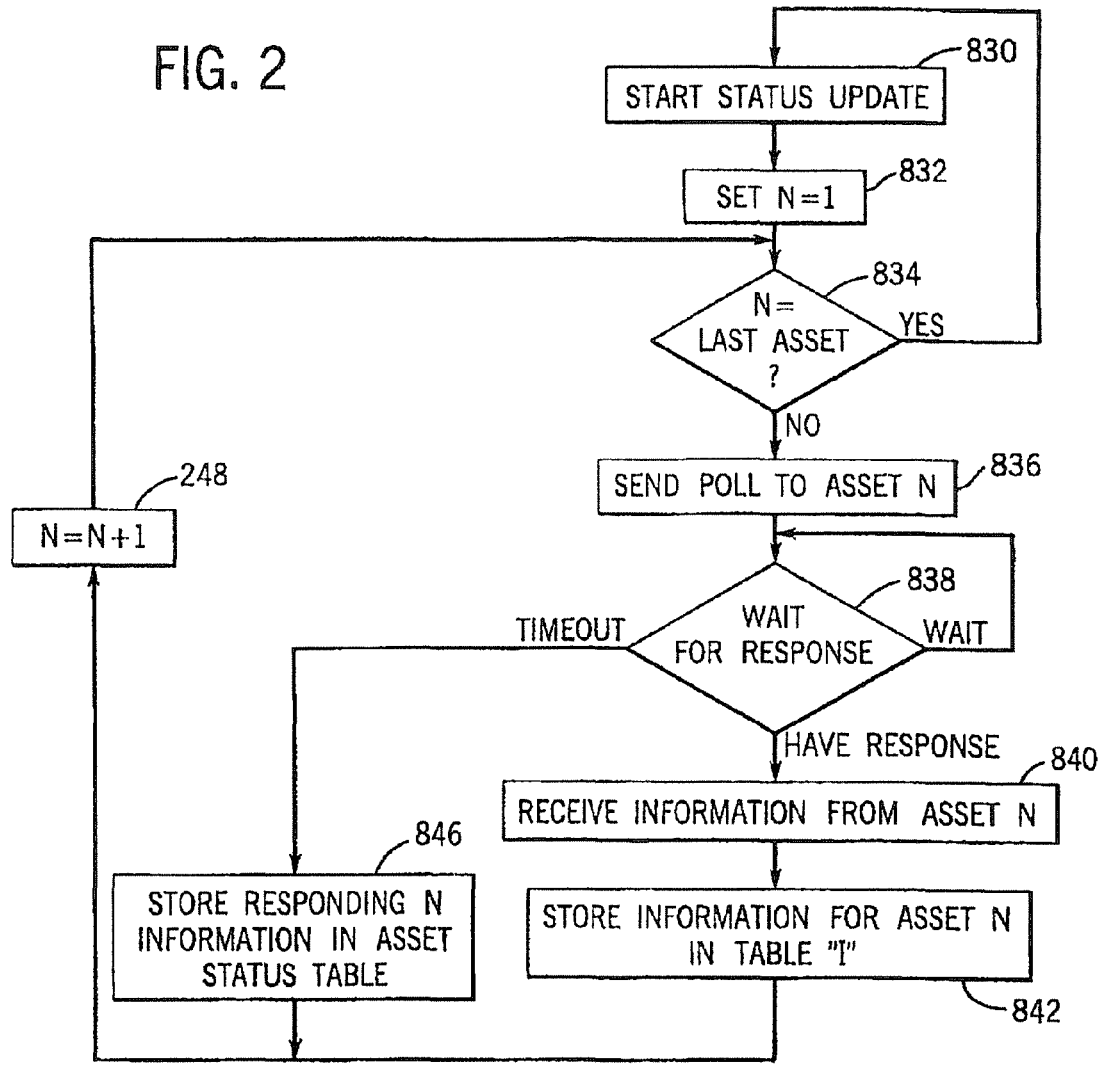
FIG. 2 is a flow diagram of a poll asset and update status sequence flow diagram in accordance with the subject invention.

The system may also be programmed to periodically poll the various sensor system to routinely check the status of the system and the assets under its supervision, as better illustrated in FIG. 2. The start asset update function 830 may be an automatic sequence or may be manually initiated. With the first step being to define the asset N to be monitored during the sequence as at 832. As shown at function block 834, the system is set to poll the various assets in sequential or programmed order. Once the asset is selected at 834, the poll is transmitted to the asset at 836 and the system is set to wait for and receive the response see 838 and 840, respectively. The poll includes all of the strategic ground based sensor systems as well as the onboard systems. The polled information is the stored in an archive file for providing a periodic log of the status and location of the asset at any time during its presence in the supervised zones, see 842. Where a response is required, the is stored as indicated at 846. As each asset poll is completed, the system is sequenced at 848 to poll the next asset.

Figure 6:
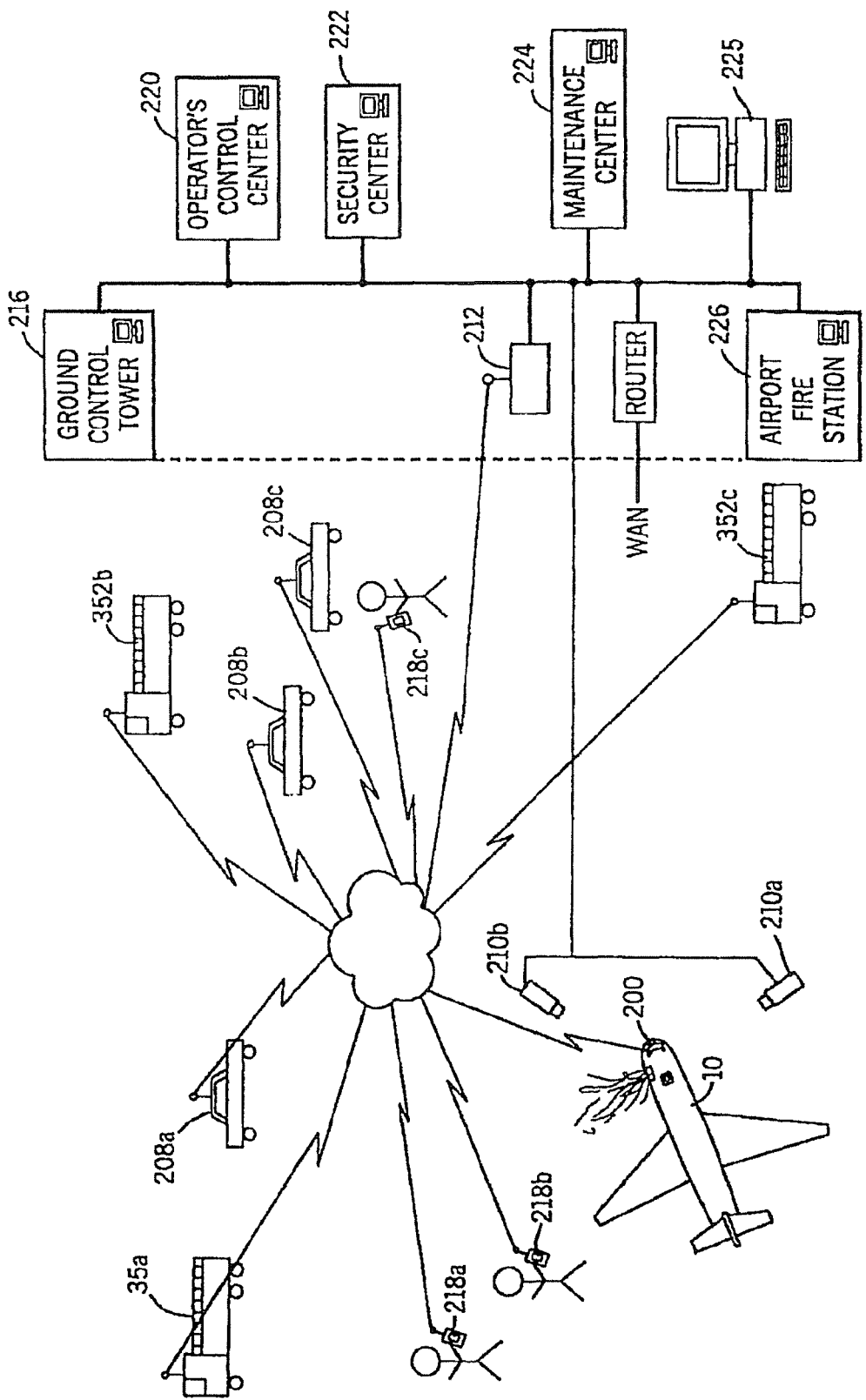
FIG. 6 is a diagrammatic illustration of the selection process techniques for identifying and alerting personnel upon the occurrence and detection of an event requiring response.

The following table illustrates a typical asset status poll and table for monitoring a plurality of assets such as those shown in FIG. 6 to determine the location, last time polled, and status of each asset, including personnel, support and response vehicles and commercial transports in the supervised zones.

ASSET STATUS TABLE

| Table | Asset # | Asset Type | Status | Latituded | Longitude | Last Update | Owner | Assoc Flight |
|---|---|---|---|---|---|---|---|---|
| 1 | 001 | Security Cruiser | Dispatched | 29.533300 | −98.457359 | 22:05:01 | Airport Police | |
| 2 | 004 | Security Officer | Idle | 29.530379 | −98.472465 | 2:05:10 | Airport Police | |
| 3 | 007 | Fire Truck | Idle | 29.536475 | :98.478815 | 22:05:11 | Airport Fire | |
| 4 | 010 | Security Cruiser | Idle | 29.542317 | −98.482099 | 22:05:14 | City Police | |
| 5 | 020 | Baggage Train | Idle | 29.531014 | −98.472611 | 22:05:15 | American Air | AA 1416 |
| 6 | 021 | Fuel Truck | idle | 29.530887 | −98.479544 | 22:05:18 | Texaco | AA 1416 |
| 7 | 026 | Aircraft 41 | Taxing | 29.536475 | −98.454513 | 22:05:19 | American Air | SWA 32 |
| 8 | 030 | Fire Truck | Dispatched | 29.53565 | −98.460570 | 22:05:22 | Airport Fire | |
| 9 | 035 | Fuel Truck | Dispatched | 29.530062 | −98.471517 | 22:05:25 | | SWA 32 |
| 10 | 041 | Security Officer | Idle | 29.529808 | −98.474874 | 22:05:27 | | |
| 11 | 047 | Baggage Train | Dispatched | 29.531459 | −98.473633 | 22:05:28 | | AA 1416 |
| 12 | 055 | Security Officer | Idle | 29.5296131 | −98.471882 | 22:05:31 | | |
| 13 | 060 | Aircraft 92 | Parked | 29.531713 | −98.473268 | 22:05:34 | | AA 1416 |

As indicated, the asset type is defined, with current status, current location and responsible party. If the asset is associated with a particular scheduled event such as the arrival of a flight, this is also indicated.

Figure 3:
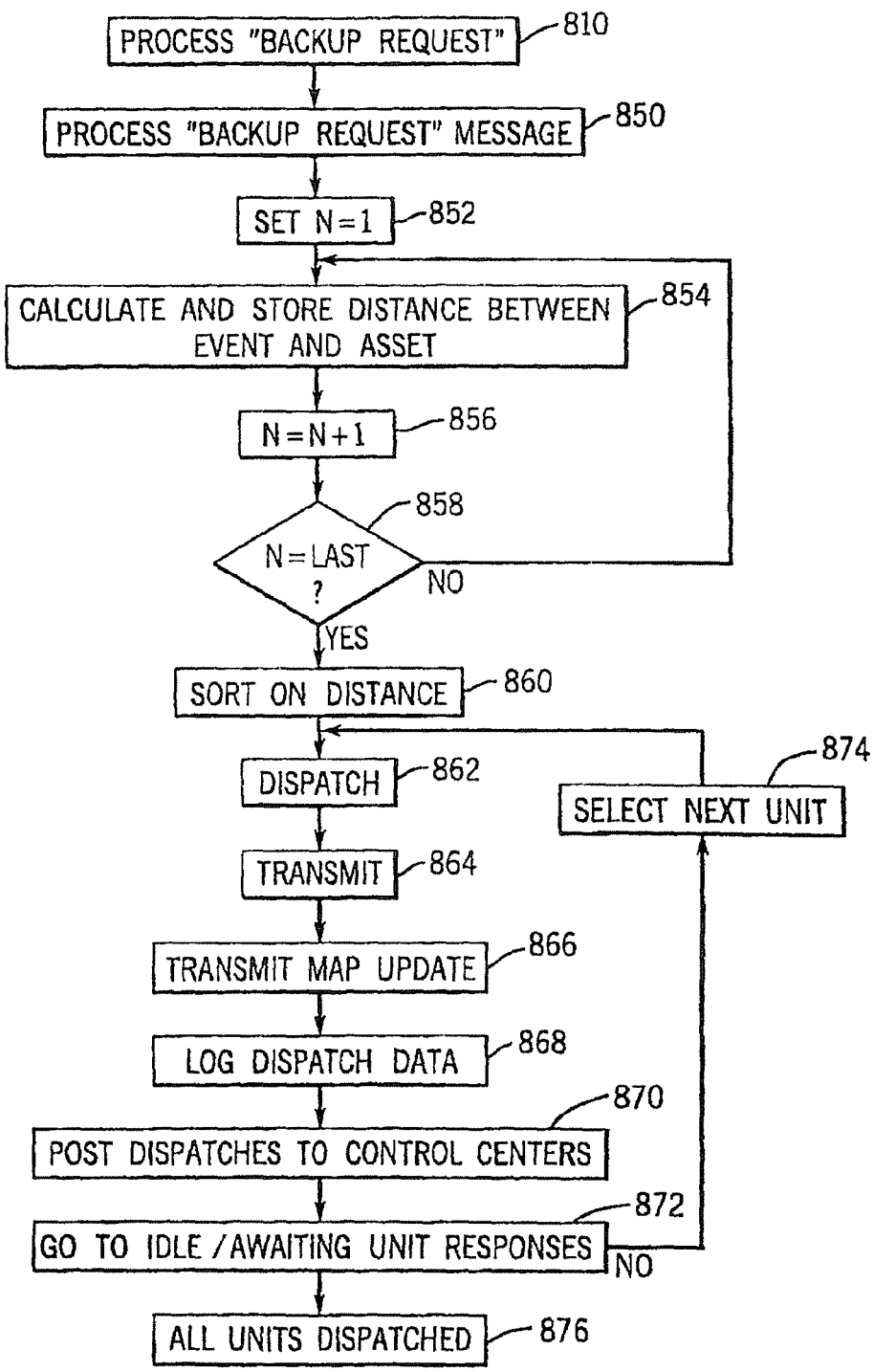
FIG. 3 is a flow diagram showing the process followed for updating a map system incorporating the data generated by the methods of the subject invention.

FIG. 3 is an example of one type of response using the system of FIG. 1. In this example, the distribution of information relating to a "backup request" response 810 (FIG. 1) is demonstrated. It will be understood that customized responses will be generated for each of the various event signals in accordance with the teachings of the subject invention. Using the "backup request" as an example, it is assumed that personnel 218*b* (FIG. 6) has approached the aircraft 10 and immediately signals for a backup, activating function 810. The backup signal is then processed at 850, and the various available assets are polled using the process shown in FIG. 2, and as indicated at 852. A distance calculation determining the assets in closest proximity is first calculated, as indicated by function blocks 854, 856 and 858, using the sequence set forth in FIG. 2. The available assets are then sorted by distance from the event, see 860. Using the information created and stored in the Asset Table, the appropriate assets are then dispatched depending on the event signal, see block 862. In the case of a "backup request" additional personnel will be sent such as the nearest police squad car 208*a* and personnel 218*a* (see FIG. 6), by transmitting the request to the appropriate assets as at 864. In the preferred embodiment of the invention, a map and route information is also, sent to the responding units, see 866. The information is logged and archived in the system, see 868 and transmitted to control centers as indicated at 870 (see FIG. 6). If the first selected response asset is otherwise occupied, i.e, is not available to respond, see 872, the next most appropriate asset is selected at 874 and dispatched via the sequence starting at 862. If no assets are available, a signal is generated as indicated at 876.

Figure 4:
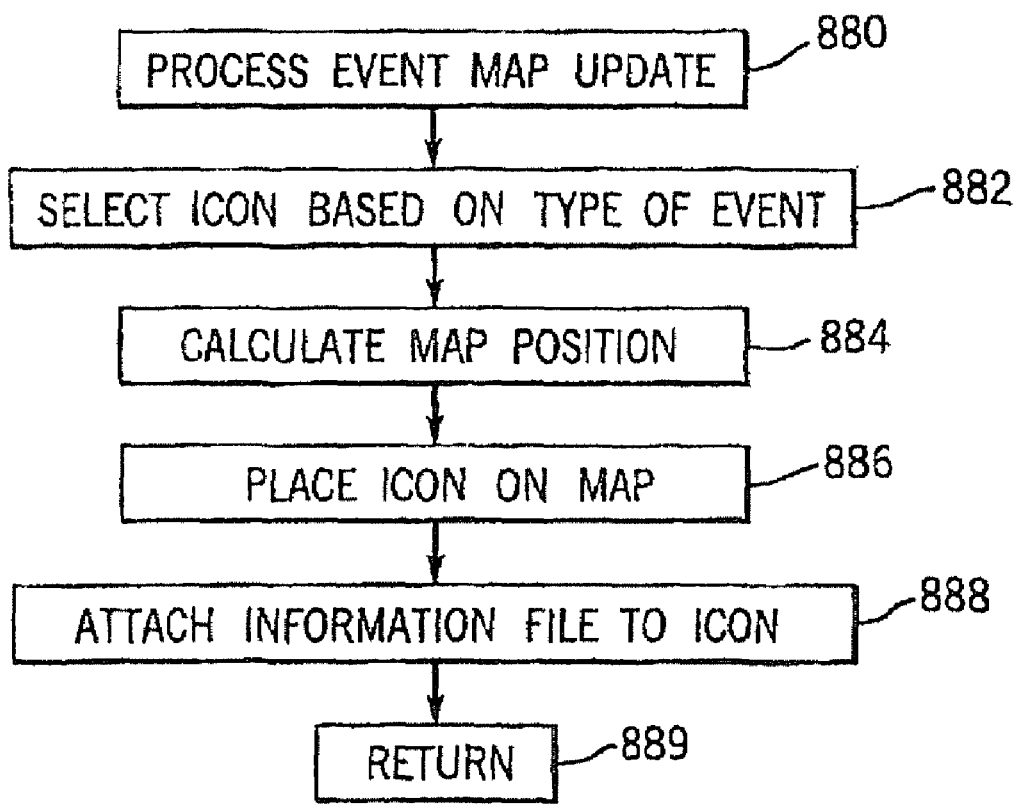
FIG. 4 is process update sequence diagram for mapping the occurrence of and response to an event.
Figure 5:
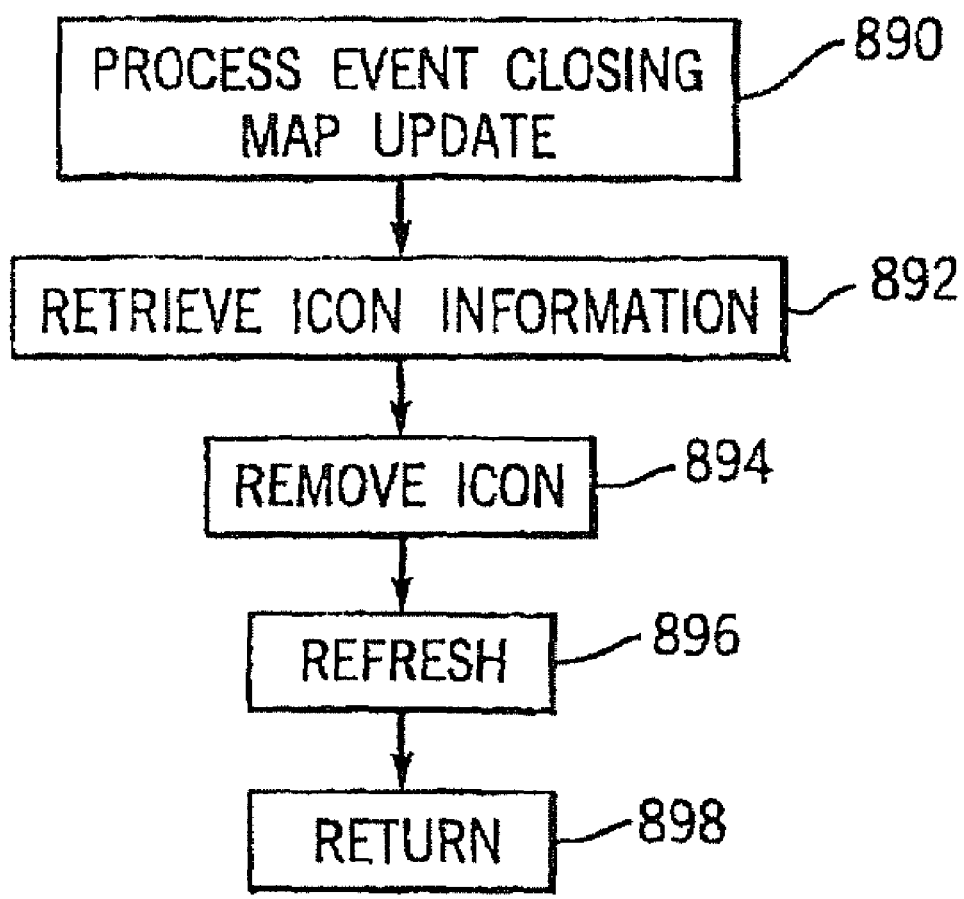
FIG. 5 is an event closing mapping sequence.

The event mapping function is demonstrated in FIG. 4, and the event closing mapping function is demonstrated in FIG. 5, respectively. Turning first to FIG. 4, the process event update sequence 880b is initiated when an event occurs. If the event is a fire as indicated in FIG. 6, an appropriate icon for indicating a fire is selected at 882 and the position is determined based on the location data as indicated at function 884. The icon is then place on the system map as indicated at 886, with appropriate information attached, see 888. This allows all personnel and assets, as well as control centers to monitor the location, response and handling of the event during its life cycle. The mapping function continually updates this and other events by the return loop indicated at 889.

It is an important feature of the system of the subject invention that not only events are detected, mapped and monitored, but the presence, type and availability of assets to handle the event are also monitored and managed. Thus, movement and deployment of assets are also treated as events.

Once an event is closed, e.g. the fire of FIG. 6 is extinguished, the map is updated to indicate that the response is completed and the event is handled. The process event closing sequence 890 is shown in FIG. 5. Once an event is closed, the closing map update sequence 890 is initiated and the response information is retrieved at 892 and the event icon is retrieved (or removed from the map) as indicated at 894, with the map being refreshed to its pre-event condition at 896. The return loop is indicated at 898.

All events can be monitored and the response managed using the system of the present invention, whether the event is a catastrophic occurrence such as the fire of FIG. 6 or it is just a routine event such as the servicing of an aircraft, with assets being deployed in the most efficient and responsive manner. Time events may also be monitored in this manner, with icons appearing as programmed.

FIG. 6 is an expanded illustration demonstrating the calculation and signaling of appropriate personnel and equipment to the site of an event requiring emergency response. By way of example, assume the tracking cameras 210a and 210b provided a visual signal indicating smoke at transport 10. At the same time, the on-board fire and smoke detectors would transmit a signal to the ground based transceiver 212 via the wireless LAN. In addition, the precise location of the transport will be known because of the location signal generated by the transport GPS sensor 200 which is also transmitted over the LAN. The receipt of these various signal will activate several actions. First, all of this information will be transmitted to the ground control tower 216 and to the operations control center 220. The airport fire station 226 will be alerted to the indication of a fire and smoke event and the security center 222 and maintenance center 224 will receive appropriate information. The automated dispatch computer center 225 will monitor the location signal provided by the transport, as well as the location signal of on ground personnel 218a-218c, response vehicles 208a-208c and fire support vehicles 352a-c. By monitoring the type of event that has occurred and both the type and location of available personnel and equipment, the dispatch center can alert and initiate the most efficient appropriate response. The location signals provide sufficient information for the computer system 225 to determine by well-known methods, which asset is closest. For example, ground personnel 218b is closest and would receive the first response signal. If a response vehicle was programmed to respond, vehicle 208a would be first alerted. Likewise, the closest fire truck is truck 352c, which would be the first alerted. As back-up is needed, each of the ground support assets have the capability of signaling for additional support directly back to the dispatch computer. The computer can then select the next closest appropriate asset. The system of the present invention provides a comprehensive, efficient method of collecting, distributing and reacting to critical information to maximize the response of appropriate functional vehicles and personnel on a real time basis while assuring that assignments are prioritized as set by operational personnel. This greatly increases both the timing and the effectiveness of response to critical events.

Figure 7:
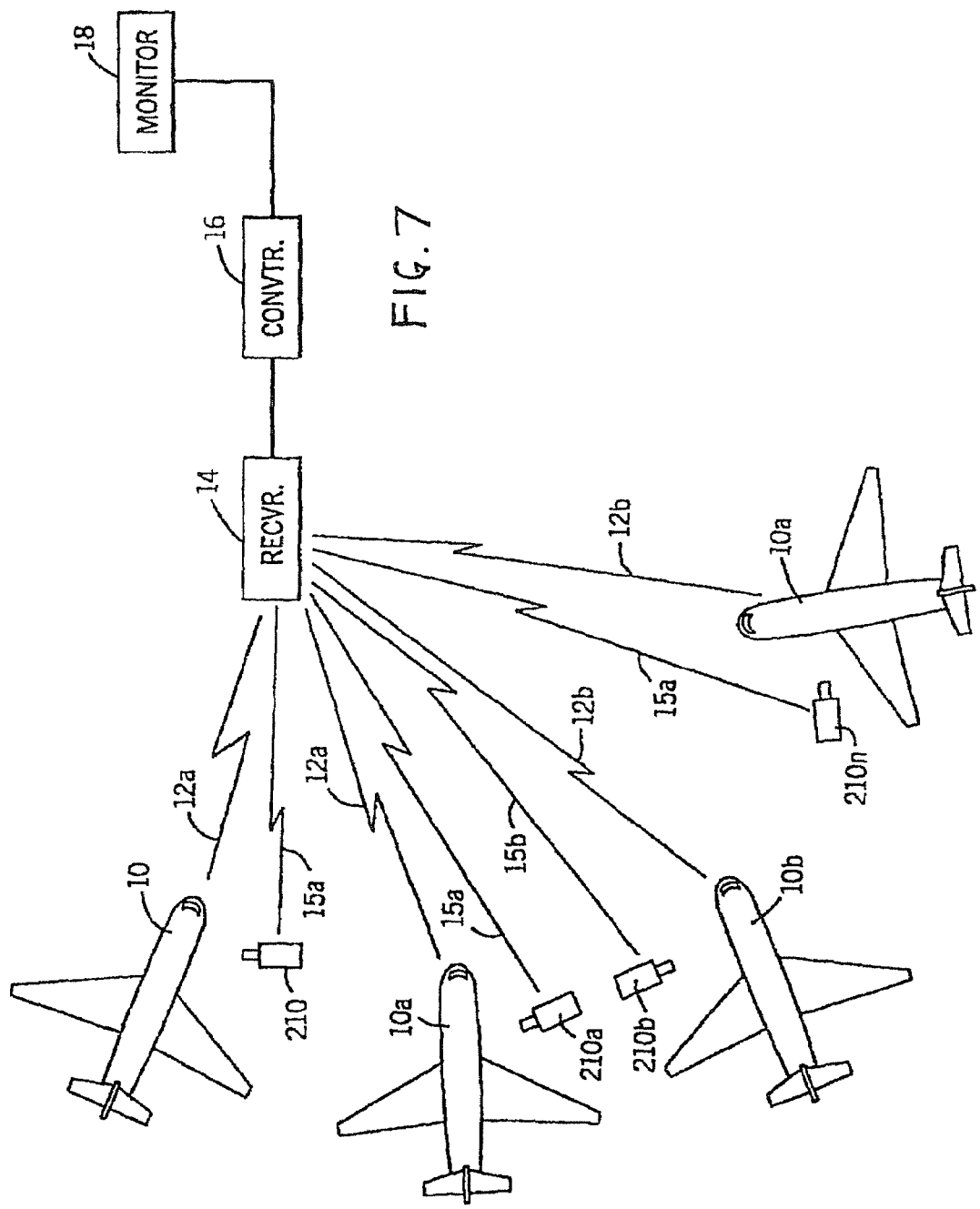
FIG. 7 is a basic diagram of the ground based security and surveillance system of the subject invention.

FIG. 7 is an illustration of a basic ground based security and surveillance system for aircraft. The aircraft 10, 10a, 10b . . . 10n will be within the view of video sensors or cameras 210, 210a . . . n when on the airport ramp. The video processor/compressor can also be used to perform still image compression to reduce the amount of data required to be transmitted over the network. This can be accomplished by using any suitable image compression algorithm, such as the industry standard JPEG algorithm, wavelet compression, $D_jV_u$ from AT&T, or other techniques. For full motion video surveillance applications, the compressor 406 may be used to provide bandwidth reduction motion video transmissions. In this application, the amount of data representing a full motion video stream would be reduced by using full motion video compression techniques such as Motion JPEG compression, MPEG compression, motion wavelet compression, or other techniques. This allows better bandwidth utilization of the wireless and wired communications channel used by the system.

The aircraft will transmit various identification signals, such as tail number, GPS location and the like, as indicated at 12, 12a . . . n, to a ground based receiver 14. The camera 210, 210a . . . n will also transmit video signals to the receiver 14, as indicated at 15, 15a . . . n. The location of the cameras will be fixed, but may be either permanent locations or "drop and place" movable units dispatched as needed, based on changing security situations. It is also possible that portable cameras will be transported by the aircraft then deployed on the ground, permitting ground surveillance in those airports where a permanent ground security system is not installed. The GPS coordinates of ground based cameras will be stored at the ground or base security station 18, or as preferred in the case of drop and place units, will be sensed by on-board GPS receivers and transmitted to the base station. The received videos from cameras may be converted by optional convertor 16 as required and transmitted to the monitor of the ground based security station 18. The convertor is used to provide compatibility between the transport's format and the ground system format. For example, for analog transmission an aircraft may transmit analog NTSC video in the United States and PAL, in England. Digital transmission may be accomplished by placing the convertors at each camera transmitting unit (see FIG. 9) thereby supporting digital data transmission for permitting transmission by the preferred wireless digital system, such as a LAN or W-LAN.

By monitoring the identification information from each aircraft, the transmitted video format from the various cameras can be matched to a specific aircraft. The signal is displayed on a monitor at station 18 where it can be viewed and monitored for surveillance and security purposes. In the event of a breach of security, security personnel may be readily dispatched to the correct aircraft using the GPS location signal to define an accurate position of the aircraft. As will be described, the security signals generated by the system of the subject invention may also be logged and inventoried for later play back, which is particularly useful for reconstruction of events. It will be readily understood that the ground components of the system may be hardwired, or other forms of wireless communication, such as, by way of example, a wireless local area network (LAN) could be utilized using radio frequency or optical communications methods, as will be readily understood by those who are skilled in the art. The system can also be modified to transmit signals from the ground-based station 18 to the various ground sensors and aircraft sensor systems. For example, a camera 210 can receive and respond to remote positioning and zooming signals. Audio warning and activation signals may be sent to the camera locations and to the aircraft to activate audio commands, sirens, lights and the like, which are integral to the system.

FIGS. 8*a* and 8*b* show two different schemes permitting transmission of monitor system data from a transport 10 to a base station monitor 18 using a wireless transmission scheme as indicated at 12. In FIG. 8*a*, the camera or sensor (for example camera 29) produces a signal which is transmitted as generated by the aircraft transmitter 76 to the base system receiver 14 and then converted at the base system by format convertor 400 for processing or viewing at the base station in its native format. Where desired, the convertor may be at the sensor site as indicated in FIG. 8*b*. Of course, depending on the various systems being utilized, multiple conversion steps may be utilized. Format conversion capability is required in order to make the system global in nature. For example, the format of each aircraft is often dependent on the country of origin. The United States and Japan generally use an NTSC camera format. France and Russia use SECAM. The United Kingdom typically uses PAL. It is important that the ground or base station be able to recognize and convert any of these formats to a suitable format for processing by the base. Compatibility with multiple, yet different, systems can be automatically accomplished. Instant protocol detection and conversion is shown and described in my copending application Ser. No. 08/816,399, filed on Mar. 14, 1997, entitled: "Instant Protocol Selection Scheme for Electronic Data Transmission via a Distributive Network".

FIGS. 9*a* and 9*b* show a basic wireless digital system. As shown in FIG. 9*a*, the transport 10 includes a sensor such as the analog camera 29 producing an analog video signal which is converted to a digital signal at convertor 510 and compress at digital compressor 512 for transmission via the wireless transmitter 76 via a digital wireless network 12. The Receiver 14 collects the signal decompresses it at decompressor 520 for input to the base station monitor 18. The system of FIG. 9*b* incorporates two-way communication with the basic digital system of FIG. 9*a*. In this embodiment the transmitter 76 is replaced with a digital transceiver 576 in the transport and the base station receiver 14 is replaced with a digital transceiver 576. This permits command data generated at the input device 501, such as, by way of example, a keyboard or mouse or joystick, to be encoded at encoder 502 and transmitted to the transport via transceivers 514 and 576. The on-board control decoder 503 then transmits the command or control signal to the device, such as, by way of example, tilt and pan control as indicated at 504 to camera 210.

FIGS. 10*a* and 10*b* are expansions of the system shown in FIG. 9*b*, adapted for use in connection with a ground-based wireless LAN 512 or a satellite based wireless LAN 612. In FIG. 10*a*, the on-board wireless LAN transceiver 576 is connected to a hardwired on-board system such as the wired LAN network 590. Preferably, the on-board sensors would be activated by the base unit on an "on-call" or a programmed intermittent basis to conserve power. The various sensor systems such as camera 210 are connected via a LAN interface 581 The base station transceiver 514 is connected to the base station LAN 530, through which the base station workstation 18 and input devices 501 are connected. In the embodiment of FIG. 10*b*, the onboard network is also wireless, such as the on-board LAN 592. In this embodiment, a local wireless LAN transceiver 578 is used to send and receive signals between the various components such as camera 210 via a local (device dedicated) wireless LAN transceiver 580. Of course, it will be understood that the base station LAN 530 can also be wired or wireless as a matter of choice.

Figure 11:
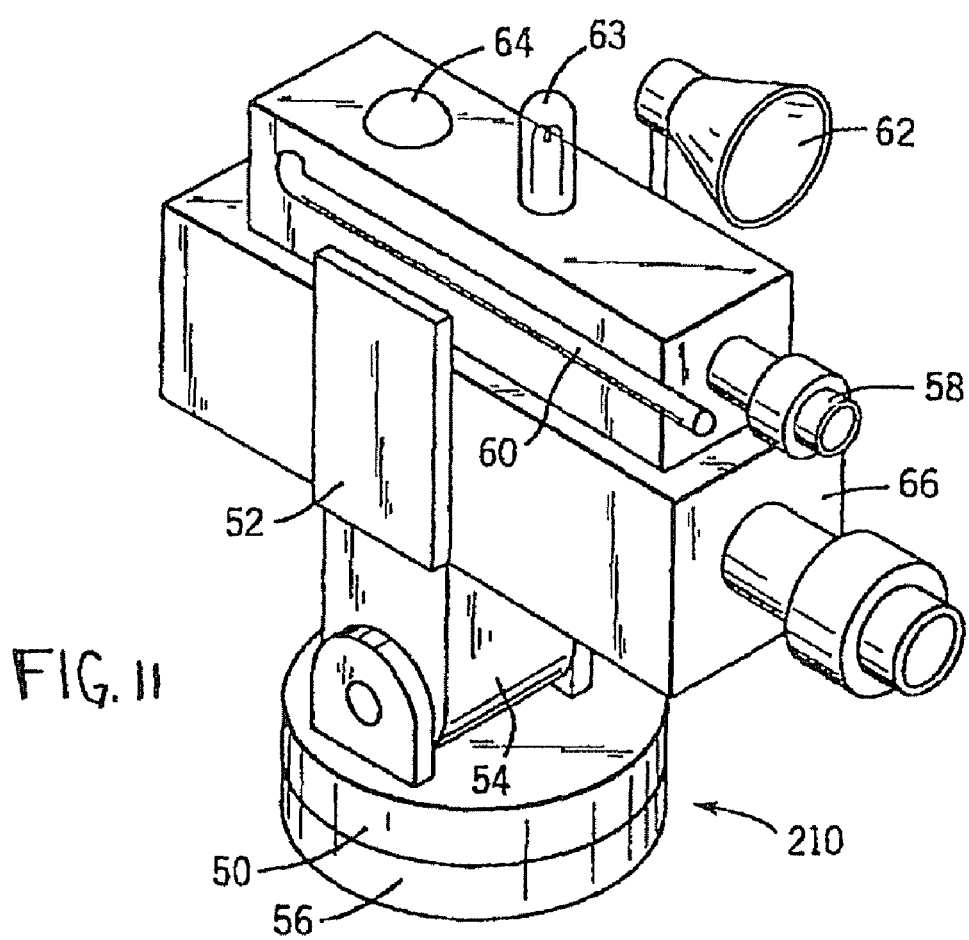
FIG. 11 is a perspective view of a multimedia camera tracking system for use in connection with the subject invention.

FIG. 11 is a perspective view of a preferred embodiment of a ground based tracking camera sensor 210. In the preferred embodiment, the cameras are adapted to respond to several different types of control signals, including but not limited to:

X-axis position control as indicated by X-axis servomotor 50;

Y-axis position control as indicated by Y-axis servomotor 54;

Lens zoom control as indicated by motorized zoom lens 58; and

Iris control as indicated by iris controller. (The iris may also be automated).

As shown in FIG. 11, the camera system includes a base or mounting bracket 56 for mounting the system at location. The system body 52 is mounted on a tilt mount 54 (y-axis) and pan mount 50 (x-axis), permitting panning (x direction) and tilting (y direction) of the camera for scanning a wide area. A motorized zoom lens 58 is provided (z direction). The preferred embodiment of the system also includes an audio sensor such as directional microphone 60. The audio sensor may be an acoustic transducer, such as a microphone, that collects audio information from the surrounding area. The collected audio can be processed to detect potential emergency conditions such as a gunshot or an explosion, or can be routed directly back to the monitoring station. Using the sensors of the subject invention, locational origin of an explosion or a gunshot or the like can be triangulated from multiple sensors and the positional origin can be calculated and displayed on maps as an overlay for assisting in pursuit of a perpetrator. The calculated origin can also be correlated by computer to the nearest appropriate emergency assets, base upon their known positions, and those assets may be automatically dispatched. The audio analog/digital convertor adapts the acoustic signal representing the audio environment into a digital data stream. The digitizer runs at real-time rates for real-time audio monitoring. The audio signal processor/compressor has two functions. It is programmed to perform detection in a number of different manners. For example, the processor algorithms can be adjusted to detect impulse noises such as gunshot or a small explosion. Detection of such an event would trigger a specified unique "alarm" for that condition to be transmitted back to other elements of the system. Other types of detection are also possible. By using frequency analysis transforms and signature profiles, noises from engines, door openings or other distinctive noises could be detected when warranted by the situation or condition. For audio surveillance applications, the compressor can also be used to provide bandwidth reduction for audio transmission. In this application, the amount of data representing a real-time audio stream would be reduced by using audio compression techniques such as LPC-10, or other well-known or proprietary algorithms. This allows better bandwidth utilization of the wireless and wired communications channels used by the system.

Illumination means such as the infrared illuminator 62 permits surveillance during low light no light conditions, without detection by unauthorized personnel. A visual light/strobe light 63 can be turned on by locally detected events, by control signal, or by other system elements such as detection by a companion sensor unit signaling over the LAN. This light can illuminate an area of concern, attract attention of security personnel as a signal, or scare away unauthorized personnel or intruders.

An integrated GPS receiver 64 is provided for generating location information. This is particularly useful for "drop-and-place" sensors as opposed to permanent sensors. Other features such as a laser range finder 66 that can measure distance to objects/personnel may be incorporated to further expand and enhance the capability of each sensor component. The camera system shown has full 360 degree field of view capability which may be controlled manually by remote control signals, may be programmed to pan the area on a time sequence, may track a moving transport using GPS signals from the transport or by using image processing "tracking software" processing the camera image, or may be responsive to and activated by an event occurrence such as from sensors distributed throughout the ramp areas, reporting activity over the LAN, in the well known manner. The range finder 66 permits the tracking system to locate objects in a precise manner and then provide control signals to permit accurate surveillance and monitoring of same, such as zooming the camera or positioning of other sensor elements. An onboard dual GPS systems on the aircraft, with one GPS at the tail and one at the nose, used in conjunction with the GPS system 64 permits the system to determine size, heading and distance to the aircraft being monitored, providing accurate location information and permitting the camera to automatically adjust to monitor the entire aircraft within its range. This permits the selection of the correct camera when multiple cameras are available and permits a wide range of viewing possibilities by being able to determine what portion, if not all, of the aircraft is to be monitored at any given time. In those instances where the aircraft is equipped with a single GPS system, much of this versatility is preserved. However, it will be understood that aircraft size then would have to be determined from the aircraft type or by optical means. When the transport is not equipped with the GPS system, the other sensors such as the range finder/tracking camera or ground level sensors would provide data for cameral selection and updating of electronic situational maps. Each sensor and/or camera may incorporate a motion sensor and/or an audio sensor activation device so that the system may be activated when a sound or a motion occurs within the sensor range. The motion detector may comprise any transducer unit that can detect the presence of an intruder and can be a device such as an infrared motion detector, a thermal sensor, an ultrasonic detector, a microwave detector, or any hybrid of two or more of these detectors "fused" together to gain better sensitivity and/or improved detection accuracy. A motion detector convertor may be incorporated to convert the signal from either a single motion detector sensor or a battery of sensors to digital form for processing and/or transmission to other system elements. Multiple elements may be contained within a single sensor system package, or may be fused for multiple sensors in geographically distributed elements with data to be fused being transmitted over the LAN. The motion detector signal processor is adapted for analyzing the sensor data streams from one or more sensors to provide for better sensitivity or improved detection accuracy. Well-known techniques may be implemented to process the transducer data and detect surges over the set thresholds that represent detection. The processor/compressor can also be configured to accept input from multiple sensors and process the inputs in a "fused" manner. For example, signals form an infrared detector and ultrasonic detector may be "added" together, then threshold detection performed. This ensures that both an optical and an acoustic return are detected before an alarm condition is broadcast. These and other more sophisticated well known techniques can be used together to gain better sensitivity and/or improved detection accuracy. Detection of such an even would trigger a specified unique alarm condition to be transmitted back to the other elements of the system.

Typically, the sensors will "sense" the presence of unauthorized activity and activate recording from the various audio and/or video equipment and activate alarms. This will initiate the generation of a signal at each of the activated units. The generated signals will then be transmitted to the monitoring and recording equipment, as described, to permit both real-time surveillance and recordation of activity at the site. Motion detection may also be determined using video time/change techniques in the well-known manner.

Figure 12:
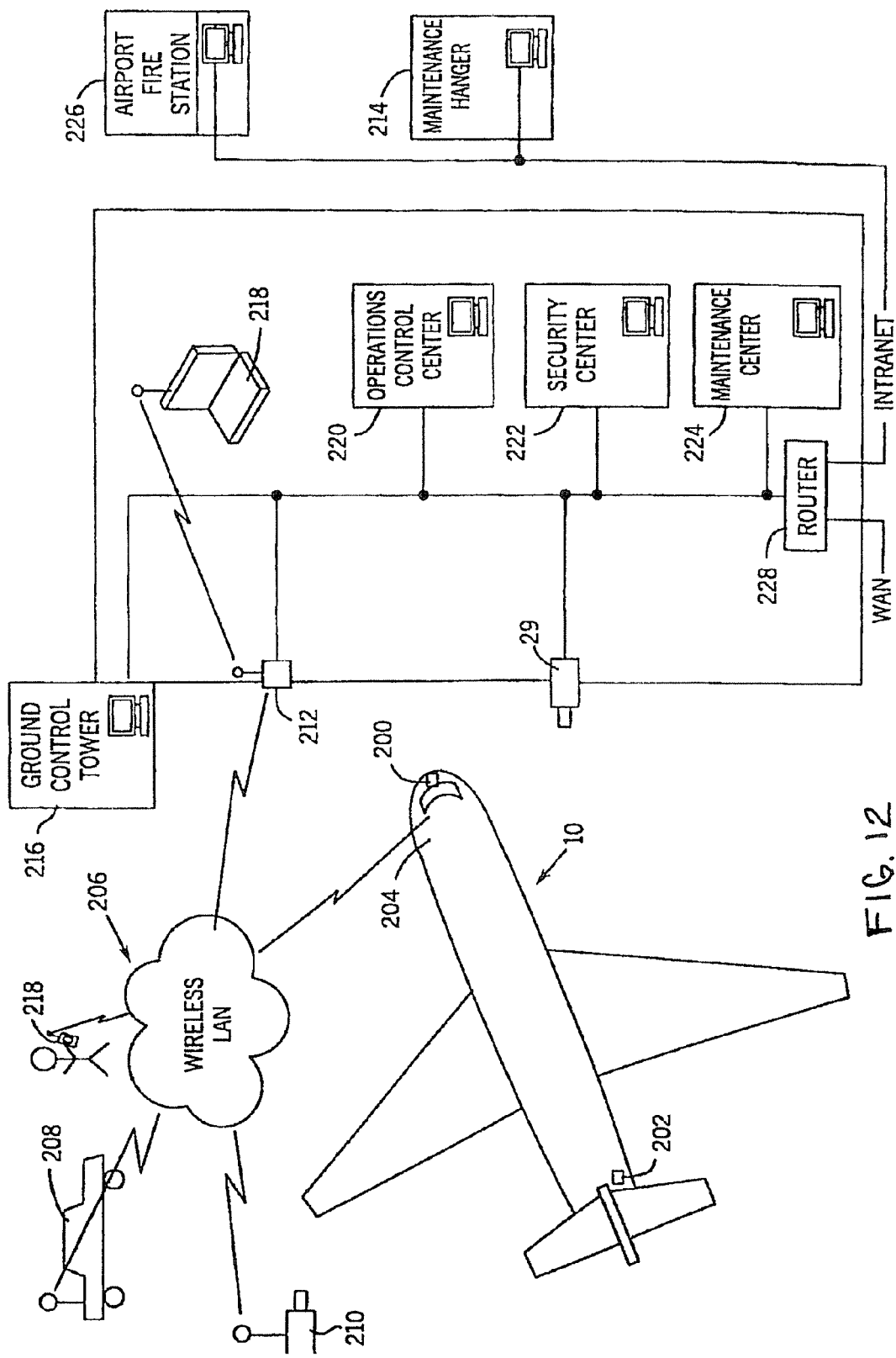
FIG. 12 is an expanded system incorporating the teachings of FIG. 7, including a remote mobile security unit and utilizing a wireless network such as a wide area network (WAN) or a local area network (LAN) as the signal transmitting and receiving system applied to the mobile components of the system.
Figure 13:
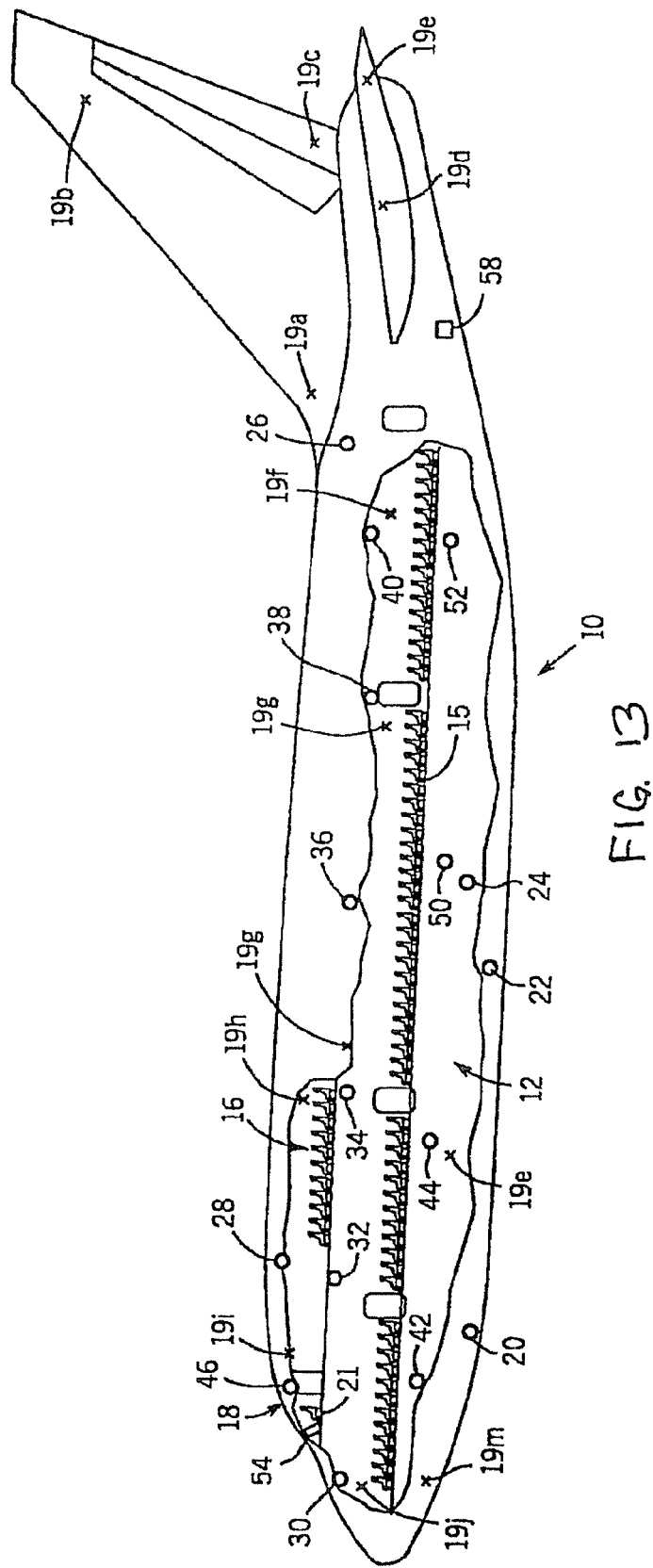
FIG. 13 is an illustration of an aircraft as an exemplary commercial transport and shows the incorporation of on board systems with the comprehensive tracking and monitoring system of the subject invention.

FIG. 12 is an expansion and further refinement of the system of FIG. 7 and is a diagrammatic illustration of the system of the subject invention as configured for a wireless local area network (LAN). In the preferred embodiment the aircraft 10 will include a comprehensive in-flight security system, as better shown in FIG. 13, which is cutaway diagram of a typical commercial airline fuselage 10, with the cargo hold 12, the passenger cabins 15, 16 and the flight deck or cockpit 21 partially visible and a plurality of sensors 19a-n. A more detailed description of this onboard system is shown and described in my aforementioned U.S. Pat. No. 5,798,458 and copending application Ser. Nos. 08/729,139, and 08/745,536. In the subject invention, the currently available sensors may be utilized, without additional enhancements or a number of additional sensors may be added. For example, ground surveillance could be accomplished using only the on-board sensors on the aircraft. In the example, a number of video image sensor devices such as, by way of example, analog video cameras, may be mounted inside the skin of the aircraft and aimed through openings or windows provided in the fuselage to focus on critical components of the aircraft, such as the landing gear cameras 20, 22, the wing engine camera 24 and the tail camera 26. Similar devices or cameras may also be strategically placed throughout the interior of the aircraft, such as the passenger cabin cameras 28, 30, 32, 34, 36, 38, 40, the cargo bay cameras 42, 44, 50 and 52, and the flight deck camera 46. The sensors 19a-n may include smoke and fire detectors, motion detectors and audio sensors strategically placed throughout the aircraft, both internal and external of the fuselage. The placement and number of devices is a matter of choice depending upon the configuration of the aircraft and the level of surveillance desired. In the preferred embodiment the on-board aircraft sensor system is used in combination with the ground based system to provide a comprehensive surveillance and security system of the aircraft while on the ground.

With specific reference to FIG. 12, in the preferred embodiment the aircraft 10 will also include a nose GPS sensor 200 and a tail GPS sensor 202. The dual GPS sensors permit redundancy, very accurate location and directional positioning of the grounded aircraft, as well as providing information identifying the size of aircraft. An aircraft reference signal (such as tail number) country of origin, owner, and the like, may be incorporated in the transmitted signal so that the monitoring station can identify the aircraft, its location and the security condition thereof by monitoring the signal from that specific aircraft. In the wireless embodiment shown, the aircraft is equipped with a wireless transceiver 204 for transmitting all of the collected signals from the sensors and cameras via the wireless network represented by the wireless communication "cloud" 206. The wireless system shown in FIG. 12 permits transmission not only to the ground control tower and security, but expands the transmission of data to all locations and stations which are part of the wireless system. For example, the signals may be transmitted to a patrolling ground security vehicle 208, a portable monitoring station 218 and/or to the ground security center via the wireless LAN transceiver 212. In addition, signals may be transmitted in either a send or receive mode from any unit in the wireless system to any other unit therein. This is particularly useful when trying to coordinate a response to an incident in a quick response mode.

As shown in FIG. 12, permanent ground units may be hardwired in typical wired LAN system configuration, with a single wireless LAN transceiver 212 serving the permanent ground base portion of the system. Depending on convenience of application, it will be readily understood that any combination of wired or wireless component configurations can be utilized. For example, it the maintenance hangar 214 were a great distance from the ground surveillance center at tower 216 a wireless (RF or optical) LAN communication link may be preferred over a hard-wired system. Use of the wireless LAN will also greatly facilitate the adaptation and retrofitting of airports not having ready cabling capability or infrastructure.

The wireless LAN 206 or other wireless communication system provides a connection between the aircraft 10, the fixed ground resources via transceiver 212, mobile ground resources such as the security vehicle 208, portable ground resources such as the portable ground security station 218 and various functional or operation centers such as the control tower 216, the operations control center 220, the security center 222, the maintenance center 224, the maintenance hangar 214 and the airport fire station 226.

In the preferred embodiment, and as shown in FIG. 12, the portable (or drop in place) camera/sensor/link device 210 (see FIG. 11 and accompanying description) is adapted for providing any combination of video surveillance, audio surveillance, motion detection, acoustic detection, sensor positioning capability and wireless link to other system elements. The security vehicle 208 is equipped with a sensor viewing capability as well as an alarm annunciator to alert the operation for quick response. Typically, the transmission of an alarm signal by the aircraft will trigger a link-up at the various monitoring units and will interrupt routinely monitored signals. The alarm signal will include aircraft identification and location data, as well as an indicator of the sensor triggering the initiation of the alarm signal. The alarm location may also be displayed on a "moving map" display, in the well know manner. This permits a quick response team to focus on the incident causing the generation of the alarm signal. In the preferred embodiment of the invention, the alarm at the sensor location is adapted to operate in either an audible or silent mode, depending on the surveillance operation. For example, a warning signal may be broadcast at the location to scare off intruders who breach a restricted area or, in the alternative, the warning signal may only be transmitted and sounded at the base station and/or security vehicles alerting base personnel of a situational change at the monitored zone. Hand held or belt mounted wireless LAN personal security assistants can also be used. These would allow personnel to have access to critical security information while on foot patrol or making rounds, permitting almost immediate response to activating conditions in their vicinity. This would also allow the automatic signaling and dispatch of personnel based upon their identity or based upon their GPS determined location.

The system wireless LAN transceiver 212 operates as the gateway to the ground based, permanent, wired facilities. A router 228 is provided to bridge the various airport facilities (i.e. an intranet). The router is a typical industry type, as is well known to those skilled in the art, and may be installed in many configurations as required. Where desired, the system may be connected to remote nodes as well, through a wide area network (WAN), permitting connection to FAA regional centers, airline corporate operations or aircraft manufacturer operations, for example. The router may be configured as needed with typical commercial techniques, such as firewalls to protect access, protocol convertors, and encryption devices, as needed to direct secure or unsecured information to the various ports, nodes and centers.

Where desired, only preselected alarm signals may be transmitted to selected centers. For example, any heat or smoke detection, fuel spill detection or medical emergency would generate an alarm signal at the fire control center 226. The maintenance hangar may have access to fluid sensor data and stored maintenance requests and records. Thus the system can be configured in an information hierarchy format where only useful information is forwarded to the various centers.

The use of the dual GPS receivers 200,202 on the aircraft 10 permits the reporting of the general location of the aircraft on the ramp during taxi when parked whether or not attended. The use of two GPS receivers provides redundancy, better accuracy and orientation information for the aircraft by reporting two distinct position datum signals. It will be readily understood by those skilled in the art that other position signal devices could be utilized such as, by way of example, a single GPS receiver and a magnetic compass (which may have to be corrected for local magnetic fields or interference). By linking the position and orientation information to the ground based centers the location and orientation of the aircraft at all times it is on the ground the aircraft may be closely monitored. Such a system provides ground control transmitting signals showing the location and movement of all aircraft while on the ground, in much the same manner the radar transponders provide air controllers with position and movement data while the aircraft is airborne. This is particularly desirable when the movement of aircraft is portrayed on a map display. Other ground vehicles such as fuel trucks, waste water trucks, baggage handling trains, security vehicles and the like can also be tagged with GPS receivers and LAN transceivers for monitoring their position relative to the aircraft on the ramp. An automated computer system can be operating in the background looking for potential collisions and generating alarm messages if such a conditions is detected. Another automated computer function can track vehicles relating to their authorized areas and issue alarms if security is breached. Yet another function can track the presence or absence of needed services, such as the timely appearance of catering trucks, fuel trucks, wastewater trucks, baggage trains and the like after the arrival of a subject transport. If any of these required services do not arrive at the transport within a prescribed time period, and "alarm" can be reported over the LAN to the missing services vehicle, and/or to the responsible operations center. This function can be completely automated by a controlling computer system.

Figure 14:
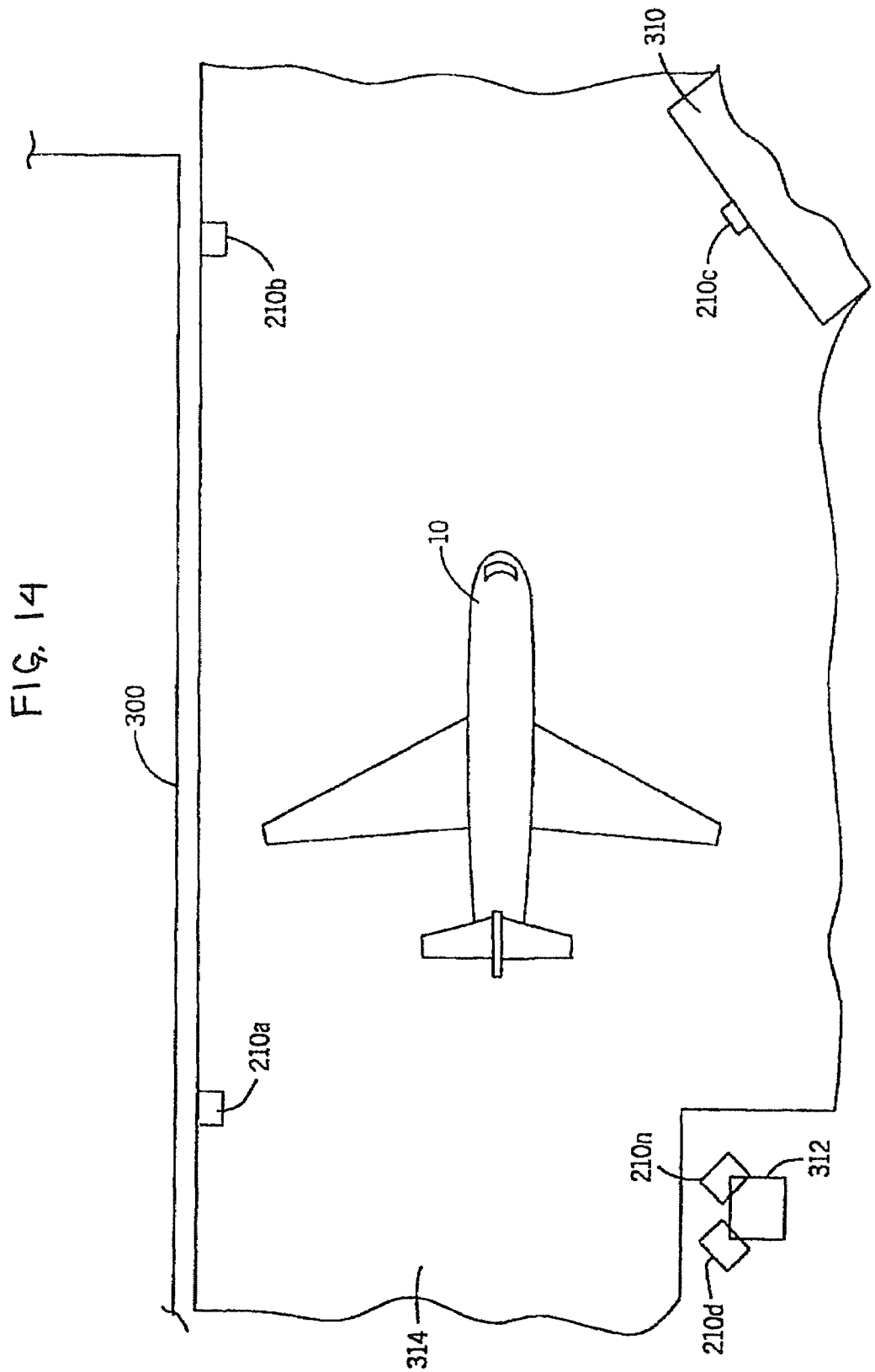
FIG. 14 shows a typical ground based system.

As shown in FIG. 14, in a typical installation, external sensors 210*a-g* placed on the ramp in the vicinity of the aircraft to monitor the exterior of the aircraft. For example, a plurality of video cameras 210a and 210b may be placed along the exterior fence 300 of an airport. In additions, cameras may be placed in other strategic locations such as the camera 210c mounted on the terminal building 310 and the remote cameras 210d-n mounted on base units 312 located strategically throughout the airport. When an aircraft 10 is parked on a surveyed area of the airport ramp 314, the various cameras 210a-n and or other ground based sensors will provide a secure area for the aircraft. Any activity within the range of the cameras may be viewed and monitored.

The system of the subject invention is designed such that aircraft onboard sensors and ground-based sensors may be used in combination to provide a comprehensive security system. The ground-based sensors may be used alone to provide basic ground security. The aircraft sensors may be used alone to provide some ground based security with a minimum of modification to existing hardware.

In the embodiments shown and described, a multi-media recorder is utilized to record the information for archival purposes. This can be a ground based recorder or the aircraft "black box" recorder 58 (shown as installed in the tail section of the aircraft, see FIG. 13) may be utilized, in the same manner as the current data and voice black boxes (not shown).

Audio and video monitors are also provided at the base security station to provide near real-time surveillance. The flight deck monitor and control panel 54 is located on the control panel in the cockpit 21 will also have access to this information. Other monitors may be provided where desired.

Figure 15:
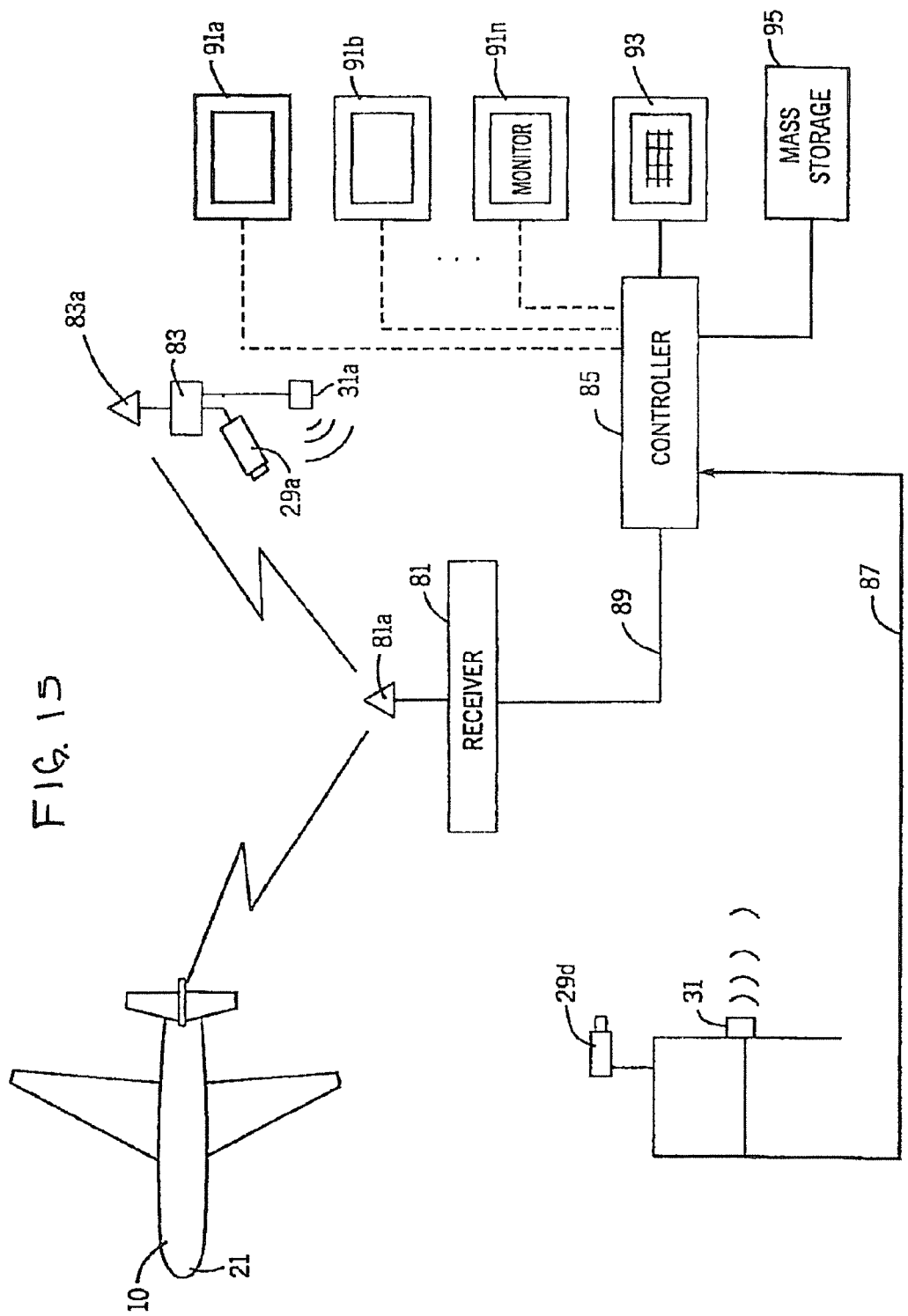
FIG. 15 is an expansion of the system shown in FIG. 9, utilizing a remote receiver and monitor station in combination with hardwired ground components, wireless ground components and an aircraft system interface.

Turning now to FIG. 15, the system shown is adapted for wireless installation using both onboard aircraft sensors and ground based remote sensors. The system shown relies on the standard on-board radio of aircraft 10 to transfer all aircraft signals to the base station receiver 81 via antenna 81a. In the alternative embodiment of FIG. 15, the ground-based cameras (camera 210d) and a motion sensor 31 are hardwired as shown at 87 to a controller 85. The on-board signals are input from the receiver via hard wire 89. Wireless ground based sensors such as the camera 210a and the motion detector 31a may be used in combination with the hardwired ground based cameras (see camera 210d) or other hardwired sensors. This permits maximum flexibility of the system architecture. The wireless signals will be transmitted via a dedicated sensor array transmitter/receiver 83 and antenna 83a.

The controller 85 will feed the data signal to a split screen monitor 93, where all video signals may be simultaneously monitored and/or to a plurality of distinct monitors 91a-91n. The split screen technology and methodology is more fully described in my copending application entitled: Wireless Transducer Data Capture and Retrieval System for Aircraft, Ser. No. 08/745,536, filed on Nov. 12, 1996, incorporated herein for reference. It will be readily understood that as many monitors and audio output devices as desired may be utilized, permitting surveillance at various locations throughout the port. In the preferred embodiment all of the signals are stored in a recording system as indicated by the mass storage unit 95. This permits replay of the transmitted signals for reconstruction of events and also provides permanent archive records where desired.

Figure 16:
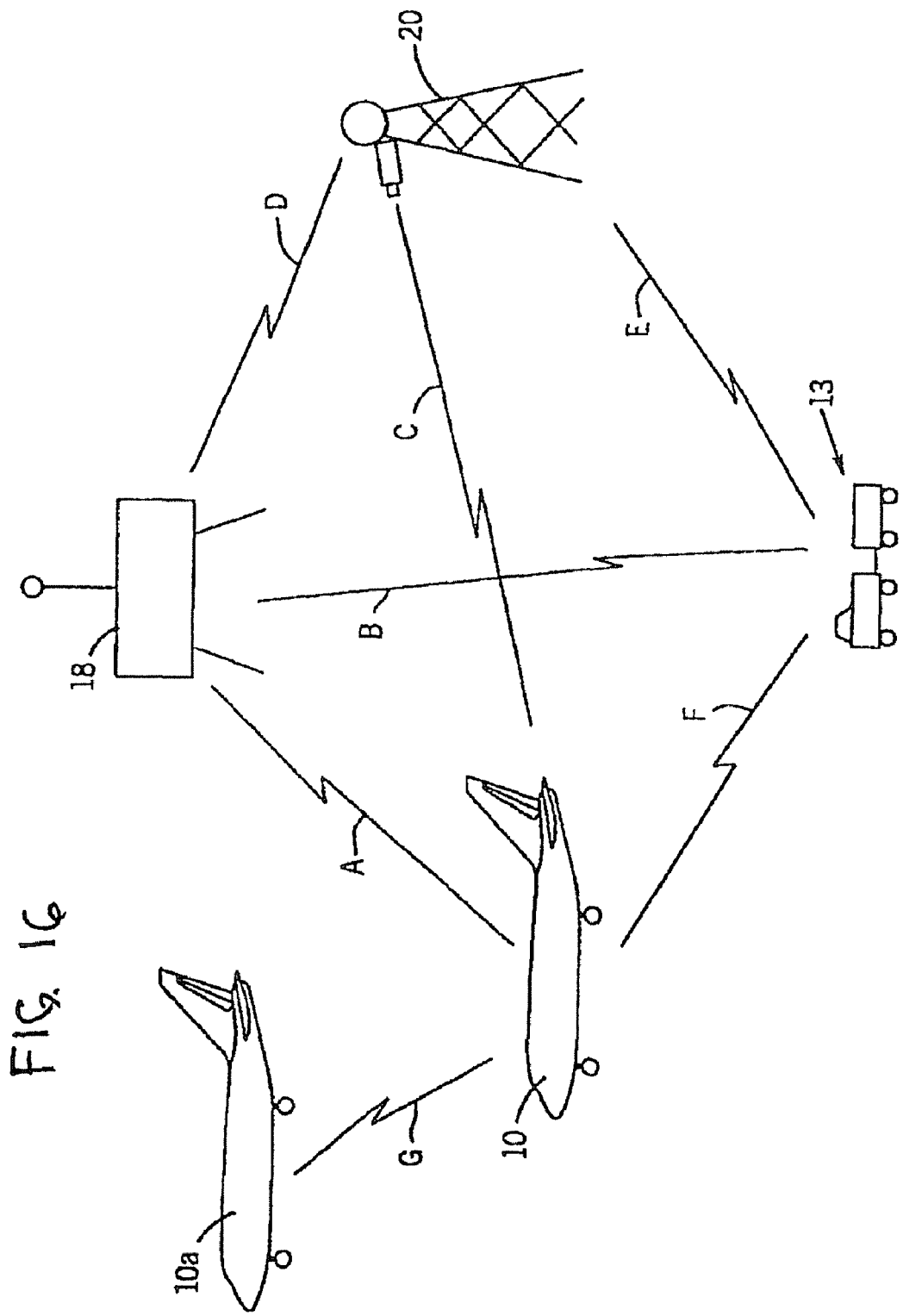
FIG. 16 is a simplified diagrammatic illustration of a wireless LAN or WAN networked system illustrating the versatility of information transmission and monitoring capabilities.

As shown in FIG. 16, the use of a wireless network provides maximum versatility in the transmission of information and the monitoring and processing capability provided by the system. As indicated in FIG. 16, the transport 10 both sends and receives information between the ground station 18, as previously described and as indicated by the wireless data path A. The transport may also transmit and receive between the fixed sensor station(s) 20 as indicated by wireless data path C. The fixed sensor station is also in direct communication with the ground station as indicated by wireless data path D. It should be understood that permanent installations such as the ground station and the fixed sensor station could be hardwired with one another without departing from the scope and spirit of the invention. In addition, support vehicles such as, by way of example, the baggage train 13 may be equipped with sensors such as location sensors and the data generated by this sensor may be transmitted to the ground station via path B, the monitor station via path E and directly to the transport via path F. The ground station 18, monitor station 20 and transport 10 may also communicate directly with the ground support vehicle 13. For example, if the ground support vehicle comes within a designated "keep-out" or no trespassing zone or is too close to the transport, a proximity sensor or calculated from the GPS data may be utilized to activate and send a warning signal to the ground support vehicle. As indicated by wireless path G, sensor data may also be communicated between multiple transports 10 and 10a.

Figure 17:
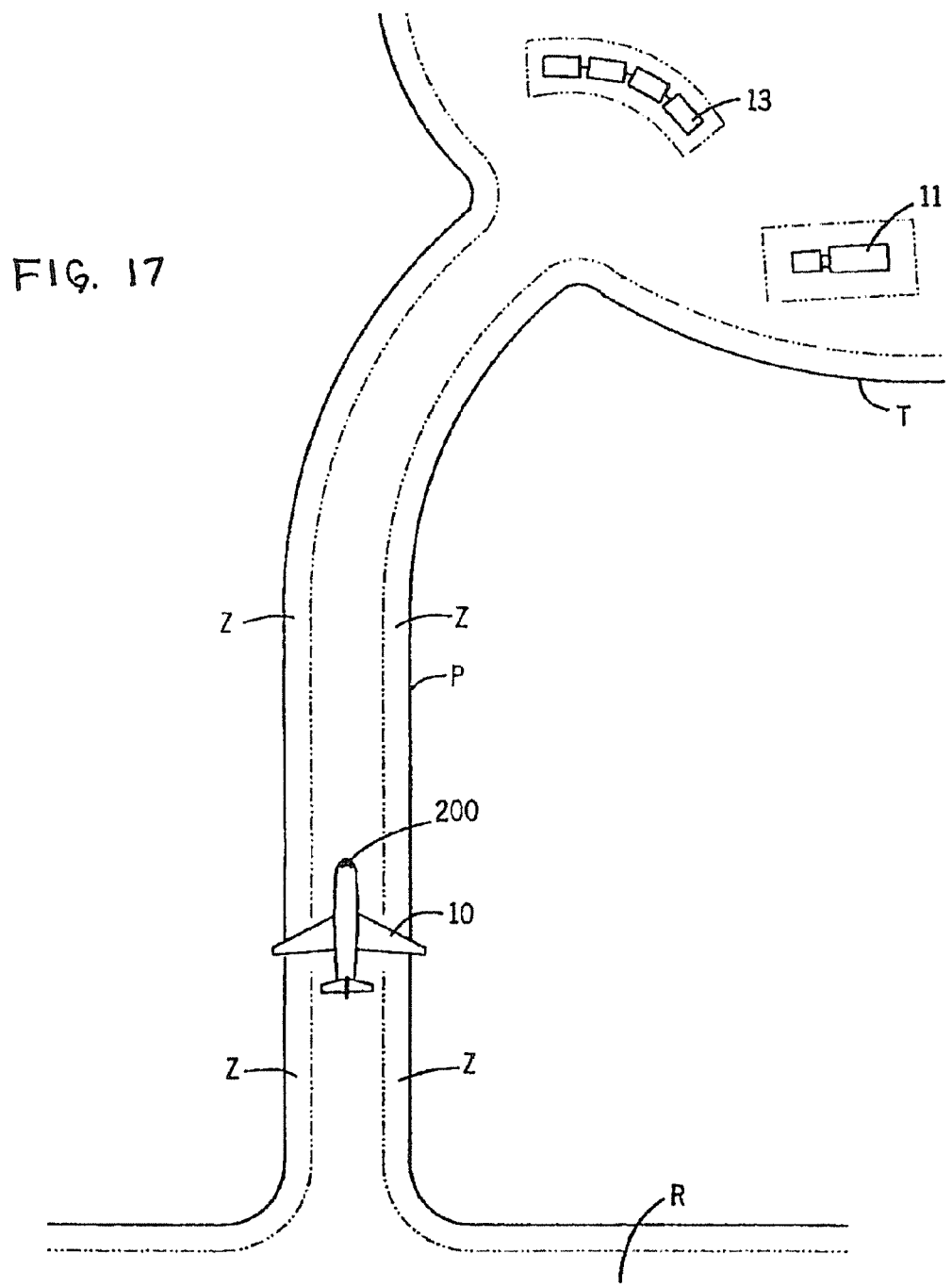
FIG. 17 is a diagrammatic illustration of the system being used in a taxi protection and/or tracking mode.

The comprehensive system of the subject invention not only provides surveillance of the aircraft while at the gate or while unattended, but also provides taxi protection and monitoring. As shown in FIG. 17, when all ground vehicles such as fuel truck 11 and baggage train 13 are outfitted with GPS receivers as well as the aircraft 10, the location and safe distance of each vehicle and the aircraft may be monitored. "Train" type vehicles may be outfitted with two or more UPS receivers to relay the length of the vehicle. Each car can have a separate module. A computerized map of the airport tarmac T, the taxiways P and runway R can be generated showing the position, direction and movement of each vehicle and the aircraft. Predefined keep-out" zones "Z" may be established and an alarm may be sounded if the zones are breached. Also, prescribed areas for authorized vehicles may be established and monitored. If a vehicle is outside the designated area, or breaches a zone "Z", an alarm condition will result. This can be prioritized as a cautionary breach, a dangerous breach and so on, depending on proximity of the various vehicles and aircraft to one another. For example, if an aircraft 10 comes too close to a fuel truck 11, alarms in the aircraft, the fuel truck will be activated. In the situation advances to a danger zone, a second alarm condition may alert ground or base personnel that a breach has occurred so the intervention may be initialized. Logging of the "safety" breaches can be made so that safety improvements or training may be implemented based on need.

A combination of ground sensors in a matrix on the airport ramp (see sensors 210a-210n in FIG. 14) will scan and monitor vehicles. If a vehicle is detected that does not have a CPS identification authorized for that location and alarm condition will result. For example, if a stray baggage train 13 entered the taxiway area, an alarm would sound indicating that the train 13 has entered an unauthorized area. Emergency and security personnel may also be alerted and dispatched if unauthorized or untagged (no GPS identifier) vehicles are present. This protection scheme could be expanded to include personnel as well as vehicles. For example, the ground vehicle can have a sensor that reads a personnel security token or device such as an encoded digital key. This key information would enable the vehicle and would also be encoded with GPS information and vehicle identification, which is transmitted over the LAN. Security software can then check to determine if the individual is authorized to be present in the vehicle at that time and location, activating an alarm if proper authorization is not confirmed. The vehicle could also be immediately shut down. Visual identification of personnel may also be accomplished using the sensor systems of the subject invention.

FIGS. 18*a*, 18*b*, and 18*c* show alternative embodiments permitting use of a wired or wireless LAN transmission system. As shown in FIG. 18*a*, with a camera sensor C1 for purposes of simplification, the camera C1 generates an analog signal which is converted to a digital signal at convertor 400 and then compressed at the motion video compressor 402. This can be accomplished by industry standard techniques such as motion-REG, MPEG, or motion wavelet compression or other current or future compression algorithms. The compressed digital signal is then packetized by the LAN interface 404 and transmitted to the LAN 206 in well-known manner. An analog audio sensor such as microphone 19 is added in FIG. 18*b* and is supported the dedicated convertor 406 and compressor 408 for input to the multiplexer 410 where the compressed digital audio signal is combined with the compressed digital video signal to produce a complex multimedia signal for packetization by the LAN 404 interface. As shown in FIG. 18*c*, digital sensors such as motion detector 31 may also be included. The motion detector digital signal does not require conversion and is input directly into the multiplexer 410. As also shown in FIG. 18*c*, the LAN may be wireless, with a wireless transceiver 412 being incorporated in the system. As previously described, any portion of the system may be wired or wireless depending on ease of installation, mobility requirements and other issues. It may be noted that functions such as the motion video compressor, audio compressor, multiplexer and LAN protocol functions may all be performed as software and could operate on one high speed computer such as a Digital Signal Processor (DSP).

Figure 19:
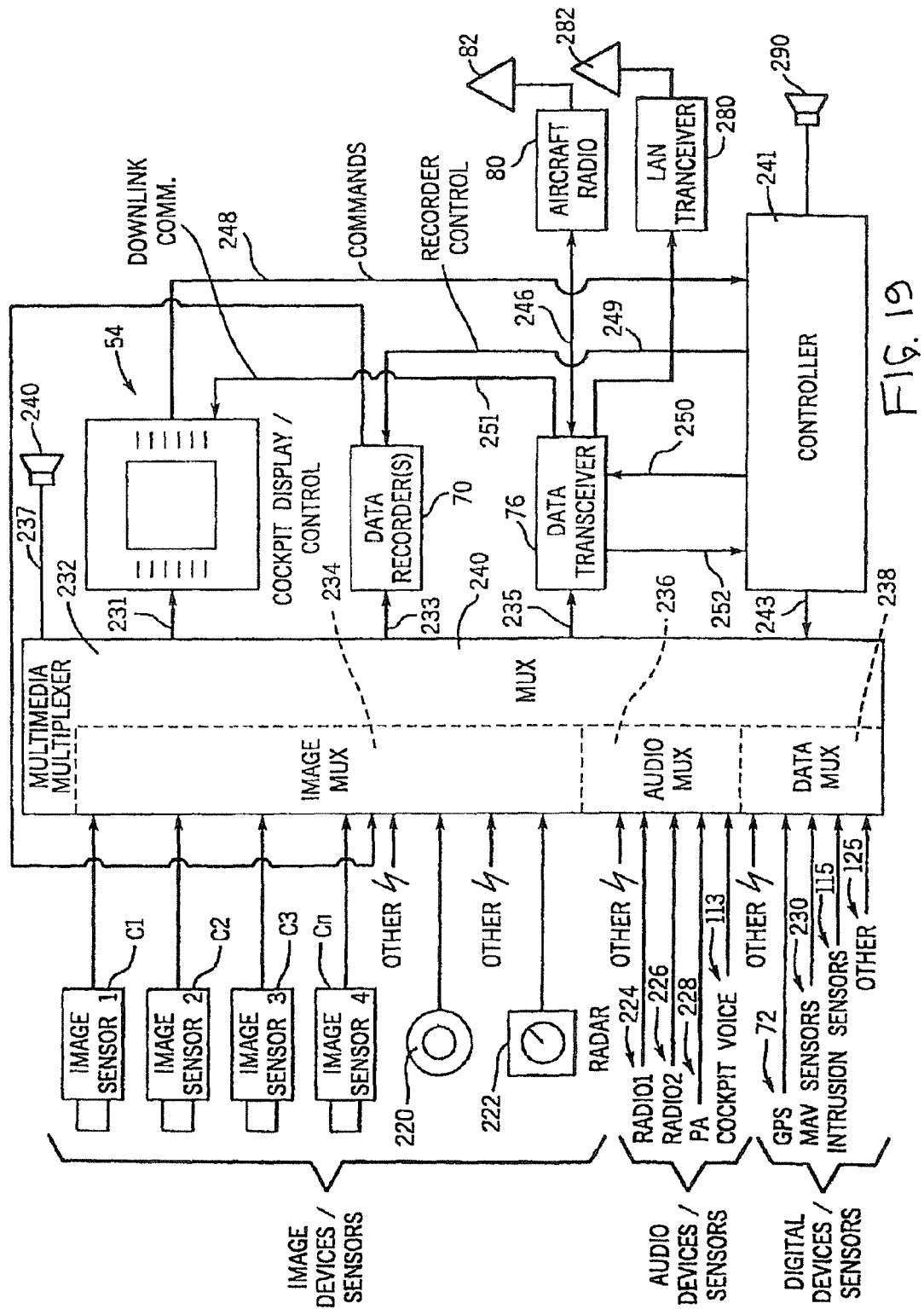
FIG. 19 is a detailed diagram of the onboard surveillance system for use in connection with transport two-way radio and/or the wireless LAN system of FIGS. 15a, 15b and 15c.

Turning now to FIG. 19, additional multi-media sensors may be incorporated in the system, as well, and may be wireless or hard wired as appropriate. For example, one or more audio sensors such as a cockpit voice sensor 113 transmit audio signals to multiplexer processor 232. Various function sensors, such as, by way of example, an entire array of intrusion security sensors 115 may also be incorporated in the multi-media system of the subject invention. Where a plurality of such sensors are utilized, it is desirable to provide a local multiplexer system 238 to minimize the amount of duplicative hardware. In the example shown, all of the intrusive security sensors in array 115 require only a single transmitter and antenna as part of a local multiplexer 238 which may then feed a combined signal to the multimedia multiplexer 232. In a wireless system, the security sensor array may also be fully self-contained with an independent power supply.

As shown, a variety of image sensor devices may be incorporated, including the video cameras C1, C2, C3 . . . Cn, an advanced imaging device such as the FLIR camera 220, the on board radar 222 and the like. All of these produce a visual signal. In addition, various audio signals may be incorporated utilizing a variety of audio sensor devices, such as a cockpit voice sensor 113, on board radios 224, 226 and the aircraft public address system 228. All of these produce an audio signal. The operational data signals are also incorporated, as previously described, and may include the GPS sensor 72, other navigational sensors 230, the various intrusion sensors 115 and other sensors 125. Thus, the system of the subject invention will accommodate a multiple input, multi-media an-ay incorporating video, audio and digital data signals into a comprehensive database for providing detailed information relating to the aircraft condition at any time.

Each sensor device signal is introduced into a multi-media multiplexer network 232 which includes a image multiplexer subsystem 234, a dedicated audio multiplexer subsystem 236 and a digital data multiplexer subsystem 238, all of which produce distinctive multiplexed signals which are introduced into a master multiplexer subsystem 232 for producing a combined, comprehensive output signal, as selected, on each of lines 231, 233 and 235. It may also perform decompression functions for compressed command streams and compressed audio or video. The setup and control of the comprehensive output signal is provided by a master controller 241 and input to the multiplexer 232 at 243. The system controller receives commands and streaming audio information from other system elements and distributes them to controlled devices. The controller performs a command decoding function to sort out command and data streams directed toward specific devices and components of the system.

The visual and textual data is available at a display monitor 54. The audio signal is output at 237 to an audio output system such as amplified speaker 240. All of the data, including all video, audio and digital data will be recorded on the recorder system 70. Information representing audio, video, sensor data, and other vital digital data is fed from the multimedia multiplexer to the recorder 70 over the signal lines 233. It should be noted that the multimedia multiplexer may be analog, digital, or packetized digital data type, or a combination of technologies based on application. Where desired, selected portions of the systems data on the aircraft may be downlinked to the ground or base station 18 (see FIG. 8) as the combined, comprehensive output signal on line 246 to be transmitted to the ground station via the aircraft radio system 80 and the antenna 82. As previously described, the information may also be transmitted to a wireless satellite via transceiver 280 and dedicated antenna 282. Once the information is generated as a useable data signal, as indicated at line 231, 233 and 235, the controller, in combination with commands from ground security, controls the collection, monitoring and review of the information. This permits access to any single sensor signal, or any combination via line 231 by sending a command via line 248 to the controller 241 for controlling the monitor related multiplexing switches via line 243 to control the signal output on line 231. For example, this may be a single camera view or an array of intrusive motion sensors 115.

Where desired, a light level detector may be is used for detecting light conditions such as the ambient lighting or transient conditions such as vehicle headlights or a flashlight. The light detector analog/digital convertor adapts the ambient light levels into a digital data stream. this digitizer runs at rear-time rates for teal-time illumination monitoring. The light detector signal processor can be programmed to look for profiles such as rapidly increasing light conditions that may indicate a vehicle or a flashlight as opposed to the rising or setting sun. Detection of such and event would trigger a specified unique alarm condition to be transmitted back to other elements of the system.

External contact sensors may also be deployed and a condition change may be detected and processed by the contact signal processor. These may be devices such as door contacts, special motion detectors such as trip wires and the like, floor pads and the like which can be connected, either by wires or wireless means to the contact detection circuit. Detection of such an event would trigger a specified alarm condition to be transmitted back to other elements of the system.

An audible speaker system can also be provided in the preferred embodiment and can provide numerous audio outputs such as, by way of example, voice output or a siren. This is a multi-function device and can be activated by local detection events, and by other system elements such as detection by a companion sensor unit signaling over the wireless system. The siren can indicate an area of concern, serve as a signal to security personnel and/or scare of intruders. The audible speaker can also be used to provide voice instructions or signals base on local detection events, and by other system elements. The controller produces the synthesized or stored voice signals. The controller can programmed or downloaded over the wireless system. The speaker system can also be use as a paging system by sending digitized or compressed voice signals over the wireless system to one or more multi-media devices. In addition, the audio speaker can be use conjunction with the audio detector 408 to communicate with the area.

Power is provided in the well-known manner. In the preferred embodiment, system power is used to power up the system through a convertor and a rechargeable battery system comprising a charger/controller and rechargeable battery supply.

In certain applications it may be desirable to combine many of the functions described herein, such as the signal processing, data multiplexing 232, LAN or WAN network transceiver 330, control and parts of the network interface, perhaps utilizing software running at high speed in a high speed DSP engine. This would serve to reduce hardware complexity, improve reliability, reduce power consumption, and reduce cost The network interface provides a wired interface to the system for connecting other system elements in a hardwired configuration. This can be any one of several well known but evolving technologies such as 10Base-T, the better 100 Base-T or high-speed Gigabit LAN or WAN technology. Such a configuration does not depart from the scope and spirit of the subject invention.

Figure 20:
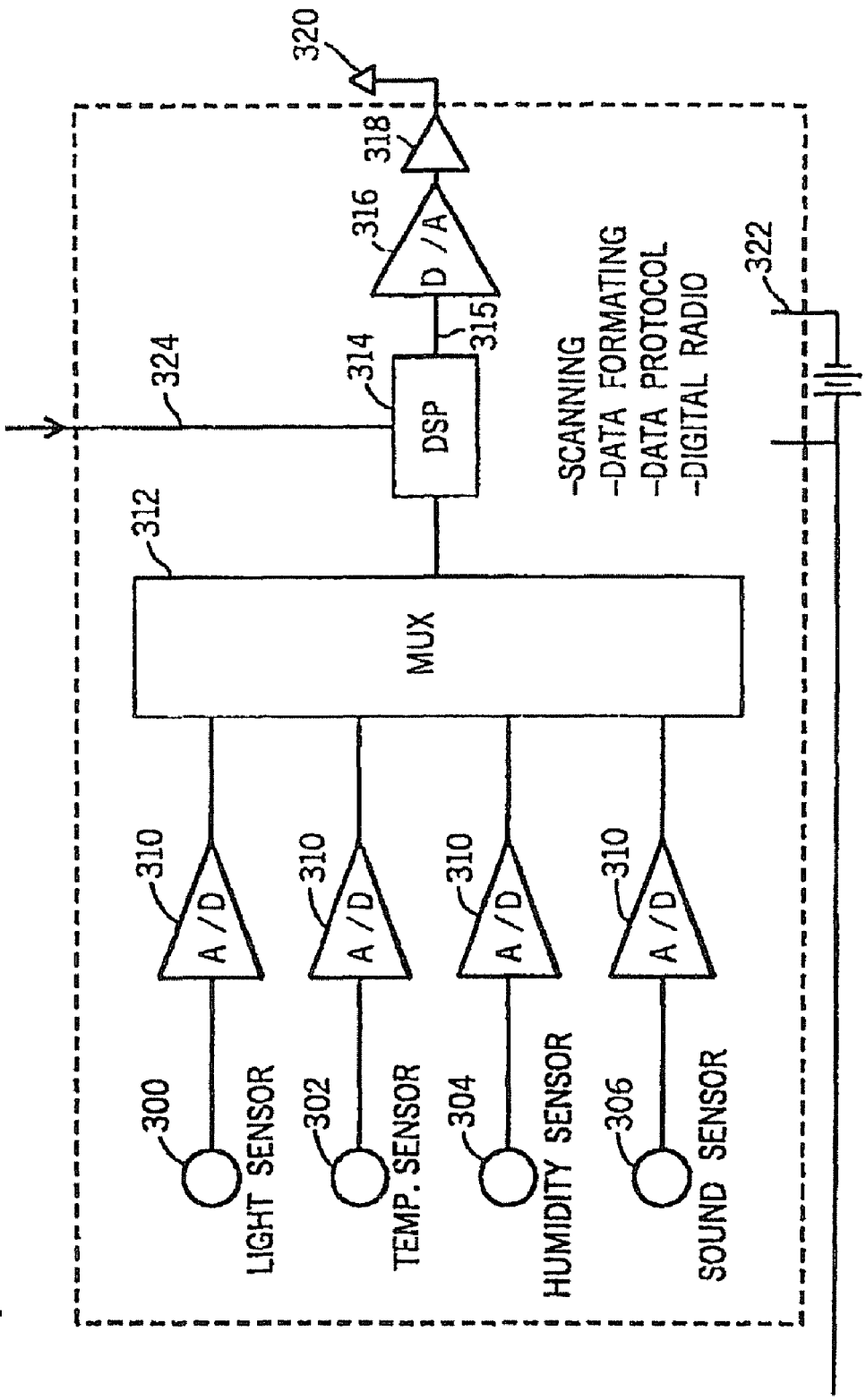
FIG. 20 is an integrated sensor/wireless LAN subsystem using DSP technology

FIG. 20 is a diagrammatic illustration of an integrated sensor/wireless LAN subsystem using DSP technology. As there shown, the various analog sensors such the light sensor 300, the temperature sensor 302, the humidity sensor 304, and the sound or audio sensor 306 (as well as other sensors as previously described herein and as desired for application) produce analog signals which are converted at one of the dedicated analog-to-digital convertors 310 and then introduced into a multiplexer 312. The multiplexer 312 produces a combined digital output signal which is introduced into the DSP processor 314, which produces the system output on line 315, where it is again converted at convertor 316, amplified at amplifier 318 and transmitted via antenna 320. In the preferred embodiment, an integral power supply 322 is provided. The Sensor I/D address is on line 324. This system provides a highly integrated sensor/processor/transceiver and typically can be housed on a single chip using available configuration technology.

Figure 21:
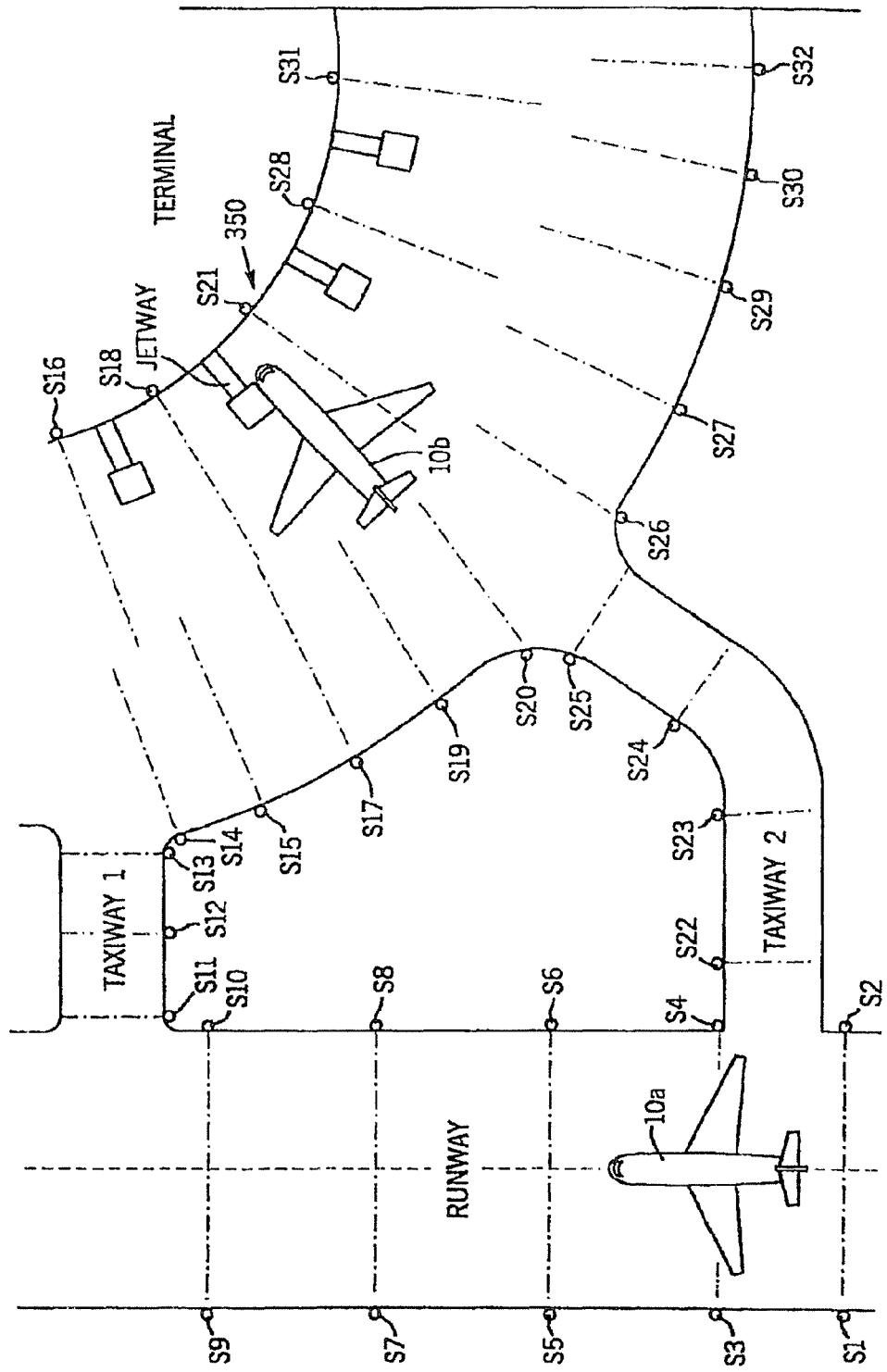
FIG. 21 is a diagrammatic illustration of the positioning of tracking sensors on the ramp, particularly well-suited for tracking assets without internal positional or tracking sensors.

FIG. 21 is a diagrammatic illustration of the placement of tracking sensors on the ramp and taxiways of an airport for tracking the movement of the commercial transports such as transports 10a and 10b as they come into the gate area 350. The sensors S1-S32, are strategically place to track the transport as it proceeds along the runway, the taxiway and the ramp. This is particularly useful for aircraft which do not have GPS signal generating sensors, making it possible to track and identify the transport at any time. Various sensing devices can be utilized in this configuration such as acoustic sensors, acoustic return "sonar", optical, optical return, microwave, microwave return, contact or weight detection, electronic proximity (underground wire), or similar sensors. The sensor system detects the transport, and where return sensors are used, will also identify the distance. By using sequential sensors, the speed and direction of travel may also be calculated. This type of sensor system will also detect the presence of other assets or personnel in the area.

The multi-media security and surveillance system of the subject invention provides an enhanced security scheme giving instantaneous and live image access to critical components and areas of an aircraft or vehicle, providing the ground based security personnel with additional information while the aircraft or vehicle is not in use and is left unattended. In addition, the permanent tape record will prove invaluable for investigating unauthorized activity or accidents after they have occurred. The preferred embodiment of the system is specifically designed for new commercial aircraft but is equally well suited for retrofit applications and for other safety applications as well, and may be scaled up or scaled down depending on application.

The video recorders, synchronizing networks and multiplexing and split screen hardware are well known and their adaptation will be readily apparent to those of ordinary skill in the art. Any suitable video recording format can be used, for example, an analog video tape recorder, a digitizer and tape, hard drive or optical drive configuration. Digital cameras could be incorporated in lieu of the standard analog type cameras currently in use in most applications. As digital technology becomes more readily available and more cost effective, it is contemplated that most of the imaging, monitoring and recording equipment will be of a digital format because of the increased reliability and the minimized space requirements. Of course, it should also be understood that the monitoring, transmitting and storage capabilities of the invention are also well suited for capturing any video or visual image generated by the on board avionics of the aircraft.

While certain features and embodiments of the invention have been described in detail herein, it will be readily understood that the invention encompasses all modifications and enhancements within the scope and spirit of the following claims.

What is claimed is:

1. A system for monitoring a location for the occurrence of an event, collecting information relating to the event, prioritizing the information and dispatching an appropriate response based on the prioritized information, the method comprising the steps of:
   a. placing strategically located sensors having a geographic location identifier in a position adapted for monitoring the location, said sensors further adapted for generating a data signal upon the occurrence of an event;
   b. providing response personnel and equipment with receivers adapted for receiving selected collected and analyzed data;
   c. further providing response personnel and equipment with location sensors for generating a location signal identifying their precise geographic location at any point in time;
   d. collecting and analyzing the data signal in order to determine the time, location and type of event; and
   e. alerting and dispatching appropriate response personnel and equipment to the location of the event based on their proximity and resources relative to the event.

2. The method of claim 1, wherein said geographic location identifiers are GPS signal generators.

3. The method of claim 1, further including the step of recording the collected and analyzed data.

4. The method of claim 1, wherein said location is a moveable asset and the location identifier is adapted for providing the step of tracking the movement of said moveable asset.

5. The method of claim 4, wherein the prioritizing step includes identifying the location of the moveable asset when an event occurs and determining the personnel and equipment in closest proximity to the moveable asset when the event occurs.

6. The method of claim 1, wherein the step of placing strategically located sensors includes the step of placing a plurality of specific location sensors at each location in order to monitor and define the type of event occurring.

7. The method of claim 6, wherein said event detection sensors are event activated.

8. The method of claim 6, wherein said event detection sensors are programmed to operate on a timed-interval basis.

9. The method of claim 6, wherein said event detection sensors operate on a real time basis for continuous monitoring of the location and wherein there is further included the step of providing an alert signal upon the occurrence of an event.

10. The method of claim 1, including the additional step of providing personnel and equipment with a signal generator for identifying the type and/or training of the personnel and the type of asset whereby appropriately equipped assets and personnel are alerted and dispatched to the event.

11. The method of claim 10, wherein the collecting step includes:
   a. identifying the type of personnel in the system;
   b. identifying the type of equipment in the system;
   c. identifying the type of event occurring; and
   d. matching the personnel and equipment to the event.

12. The method of claim 10, wherein the alerting and dispatching step includes alerting the matched personnel and equipment to respond based on proximity to the event.

13. The method of claim 1, further including the step of collecting feedback data from the personnel and equipment dispatched to an event in order to assure response.

14. The method of claim 13, further including the step of logging the feedback data for archive purposes.

15. The method of claim 1, further including the step of mapping the location of an event on a system map.

16. The method of claim 15, wherein the mapping step further includes selecting and positioning and event identifying icon on the system map.

17. The method of claim 16, wherein the mapping step further includes tagging the icon with event critical information.

18. The method of claim 16, further including the step of removing the event icon once an event is closed.

19. A security monitoring, surveillance and event response system comprising: a. a ground based monitoring station for monitoring the position of and conditions relative to a commercial transport when in port; b. a network of ground based sensors each operational within a predefined operating zone and adapted for monitoring a selected conditions associated with the commercial transport while within the operating zone for generating a unique data signal representing the specific condition to be monitored for describing the condition and location of the commercial transport while within the zone; and c. communication system for transmitting the unique data signal from each of the network of sensors to the ground based monitoring station for monitoring the selected conditions at the commercial transport, whereby both the condition and the location of the commercial transport may be determined, the communication system adapted for identifying the event based on the unique data signal and for generating a response based on the location and type of event.

20. The system of claim 19, wherein at least one of the ground based sensors is hard-wired directly to the ground based monitoring station.

21. A system for monitoring an environment on board a movable transport, the system comprising:
   at least one camera on board the transport, the at least one camera being trained on a field of view, the at least one camera collecting image data of the field of view, the at least one camera including a compressor, the compressor being configured to compress the image data to generate compressed image data, the at least one camera being configured to output the compressed image data;
   at least one GPS receiver on board the transport, the at least one GPS receiver being configured to generate GPS location information about a location of the transport;
   at least one wireless transmitter on board the transport, the at least one wireless transmitter being configured to receive the compressed image data, the at least one wireless transmitter being configured to receive the GPS location information, the at least one wireless transmitter being configured to transmit at least one wireless transmission, the at least one wireless transmission carrying the compressed image data, the at least one wireless transmission carrying the GPS location information;
   a wireless receiver remote from the transport, the wireless receiver being configured to receive the at least one wireless transmission;
   an internet protocol network in communication with the wireless receiver, the internet protocol network being configured to carry the compressed image data, the internet protocol network being configured to carry the GPS location information; and
   at least one monitoring station in communication with the internet protocol network, the at least one monitoring station being configured to display for viewing at least one displayed image of the field of view of the at least one camera, the at least one displayed image being associated with at least one of the following:
   the GPS location information, the at least one GPS receiver, the at least one camera, the transport.

22. The system according to claim 21 and further comprising:
   at least one software application embodied in media, the at least one software application being executable upon a suitable processor, upon occurrence of a response event relating to the movable transport execution of the at least one software application performing a response analysis, the response analysis providing at least one result.

23. The system according to claim 22 and further comprising:
   the at least one result being dependent upon at least one of the following:
   consideration of the response event according to event type, consideration of location of the response event, consideration of the transport according to transport type, consideration of identity of the transport, consideration of location of the transport, consideration of route of the transport, consideration of image data of the at least one camera, consideration of a location of the at least one camera, consideration of a location of the field of view, consideration of output of an executable image recognition application processing image data of the field of view, consideration of the image data, consideration of a sensor signal according to sensor type, consideration of location of a sensor, consideration of an alarm signal according to alarm type, consideration of location of an alarm signal, consideration of alarm source, and consideration of time of occurrence of the response event.

24. The system according to claim 23 and further comprising:
   the sensor signal originating from an audio sensor on board the movable transport.

25. The system according to claim 22 and further comprising:
   at least one response resource indicia accessible by the at least one software application, the at least one response resource indicia indicating a status of at least one response resource;
   the at least one result being dependent upon the at least one response resource indicia.

26. The system according to claim 25 and further comprising:
   the at least one response resource indicia including location information of the at least one response resource, the at least one result being dependent upon location information of the at least one response resource.

27. The system according to claim 25 and further comprising:
the at least one response resource indicia including information about response capability for an event type of the at least one response resource, the at least one result being dependent upon response capability for an event type of the at least one response resource.

28. The system according to claim 26 and further comprising:
the at least one response resource indicia including information about response capability for an event type of the at least one response resource, the at least one result being dependent upon response capability for an event type of the at least one response resource.

29. The system according to claim 25 and further comprising:
the at least one result providing information for alerting at least one response resource to respond to the response event.

30. The system according to claim 25 and further comprising:
the at least one result providing information about comparison of status for at least two response resources.

31. The system according to claim 30 and further comprising:
the information about comparison of status including comparison of time for arrival at an event location of at least two response resources.

32. The system according to claim 30 and further comprising:
the information about comparison of status including comparison of information about response capability for an event type of at least two response resources.

33. Application software for use in a monitoring system, the application software being embodied in suitable media, the application software being executable by a processor, execution of the application software performing a response analysis for a movable transport, the monitoring system including at least one monitoring station remote from the transport, the monitoring system including an internet protocol network in communication with the at least one monitoring station for communicating information from at least one wireless receiver to the at least one monitoring station, the internet protocol network conveying to the at least one monitoring station compressed image data, the compressed image data when decompressed being used to generate a display for viewing at the monitoring station at least one visual image from a field of view of at least one camera on board the transport, the internet protocol network conveying to the at least one monitoring station GPS location information, the GPS location information being generated by at least one GPS receiver on board the transport, the monitoring system including at least one wireless transmitter on board the transport for transmitting at least one wireless transmission to the at least one wireless receiver, the at least one wireless transmission conveying the compressed image data to the at least one wireless receiver, the at least one wireless transmission conveying the GPS location information to the at least one wireless receiver, the application software comprising:
the application software being configured to receive input, the input including the GPS location information and at least one of the following:
an event type of a response event,
a transport type of the transport,
identity of the transport,
travel route of the transport,
image data of at least one camera on board the transport,
location of the at least one camera,
location of a field of view of the at least one camera,
output from an executable image recognition application software, the image recognition application software processing image data of the field of view of the at least one camera,
a sensor type for a sensor originating a sensor signal,
location of a sensor originating a sensor signal,
an alarm type for an alarm originating an alarm signal, and
location of an alarm originating an alarm signal; and
the application software being configured to generate at least one result upon occurrence of a response event, the at least one result being dependent upon the input, the at least one result providing information for alerting at least one response resource to respond to the response event.

34. The application software according to claim 33 and further comprising:
the sensor signal originating from an audio sensor on board the movable transport.

35. The application software according to claim 33 and further comprising:
the application software being configured to access at least one response resource indicia, the at least one response resource indicia indicating a status of at least one response resource;
the at least one result being dependent upon the at least one response resource indicia.

36. The application software according to claim 35 and further comprising:
the at least one response resource indicia including location information of the at least one response resource, the at least one result being dependent upon location information of the at least one response resource.

37. The application software according to claim 35 and further comprising:
the at least one response resource indicia including information about response capability for an event type of the at least one response resource, the at least one result being dependent upon response capability for an event type of the at least one response resource.

38. The application software according to claim 36 and further comprising:
the at least one response resource indicia including information about response capability for an event type of the at least one response resource, the at least one result being dependent upon response capability for an event type of the at least one response resource.

39. The application software according to claim 35 and further comprising:
the at least one result providing information about comparison of status for at least two response resources.

40. The application software according to claim 39 and further comprising:
the information about comparison of status including comparison of time for arrival at an event location of at least two response resources.

41. The application software according to claim 39 and further comprising:
the information about comparison of status including comparison of information about response capability for an event type of at least two response resources.

* * * * *